US011880237B1

(12) United States Patent
Mantrawadi et al.

(10) Patent No.: US 11,880,237 B1
(45) Date of Patent: Jan. 23, 2024

(54) WEARABLE DEVICE WITH DISPLAY

(71) Applicant: AMAZON TECHNOLOGIES, INC., Seattle, WA (US)

(72) Inventors: Manish Avinash Mantrawadi, Redmond, WA (US); Douglas W. Moskowitz, Bellevue, WA (US); Ippei Matsumoto, Daly City, CA (US); Michael Flynn, Seattle, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 322 days.

(21) Appl. No.: 17/032,803

(22) Filed: Sep. 25, 2020

(51) Int. Cl.
*G06F 1/16* (2006.01)
*G04G 17/08* (2006.01)
*G04G 17/04* (2006.01)
*G04G 21/02* (2010.01)

(52) U.S. Cl.
CPC ........... *G06F 1/163* (2013.01); *G04G 17/045* (2013.01); *G04G 17/08* (2013.01); *G06F 1/1607* (2013.01); *G04G 21/02* (2013.01)

(58) Field of Classification Search
CPC ...... G04G 17/045; G04G 17/08; G04G 21/02; G04G 17/04; G06F 1/163; G06F 1/1607; A61B 5/681; A61B 5/02427; A61B 5/01; A61B 5/6898; G04B 37/1486
USPC ..................................................... 361/679.03
See application file for complete search history.

(56) References Cited

U.S. PATENT DOCUMENTS

| 8,046,032 B2* | 10/2011 | Babella ................ H01H 13/705 345/169 |
| 2014/0371601 A1* | 12/2014 | Fei ........................ A61B 5/0261 600/476 |
| 2015/0241916 A1* | 8/2015 | Choi ...................... A61B 5/1118 361/679.03 |
| 2016/0040698 A1* | 2/2016 | Perkins .............. A44B 11/2596 24/664 |
| 2016/0058311 A1* | 3/2016 | Kondo ............... A61B 5/02438 600/479 |
| 2016/0064804 A1* | 3/2016 | Kim ........................ H01Q 5/371 343/702 |
| 2016/0070339 A1* | 3/2016 | Crawford ................ G06F 3/011 345/156 |
| 2017/0011210 A1* | 1/2017 | Cheong .................. A61B 5/681 |
| 2017/0296088 A1* | 10/2017 | Choi ..................... A61B 5/7271 |

(Continued)

*Primary Examiner* — Adrian S Wilson
*Assistant Examiner* — Gage Crum
(74) *Attorney, Agent, or Firm* — Lindauer Law, PLLC

(57) ABSTRACT

A wearable device has a housing containing electronics and a band that retains the wearable device on a user's arm. Each end of the housing has an open receptacle. The band has protrusions made from an elastomeric material and includes a rigid member arranged at least partially within. The protrusions are inserted into the receptacle to attach the band to the housing. A lower portion of the housing comprises two pieces that, when assembled, provide optical baffles between adjacent optical devices such as a heart rate monitor, and windows for the optical devices to operate. A thermal conductor is retained between the two pieces and facilitates operation of a temperature sensor in the device. An antenna carrier facilitates installation of an antenna without impairing fixation of an upper portion of the housing. A compact charger clips to the housing to supply power to recharge a battery in the wearable device.

20 Claims, 13 Drawing Sheets

(56) References Cited

U.S. PATENT DOCUMENTS

2017/0315511 A1* 11/2017 Shim ................... A61B 5/721
2018/0235483 A1*  8/2018 Mouradian ............ G06F 1/163
2018/0262226 A1*  9/2018 Erentok ................ H04B 1/385

* cited by examiner

WEARABLE DEVICE WITH DISPLAY

BACKGROUND

Wearable devices provide a variety of useful functions to users.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

Figure 1:
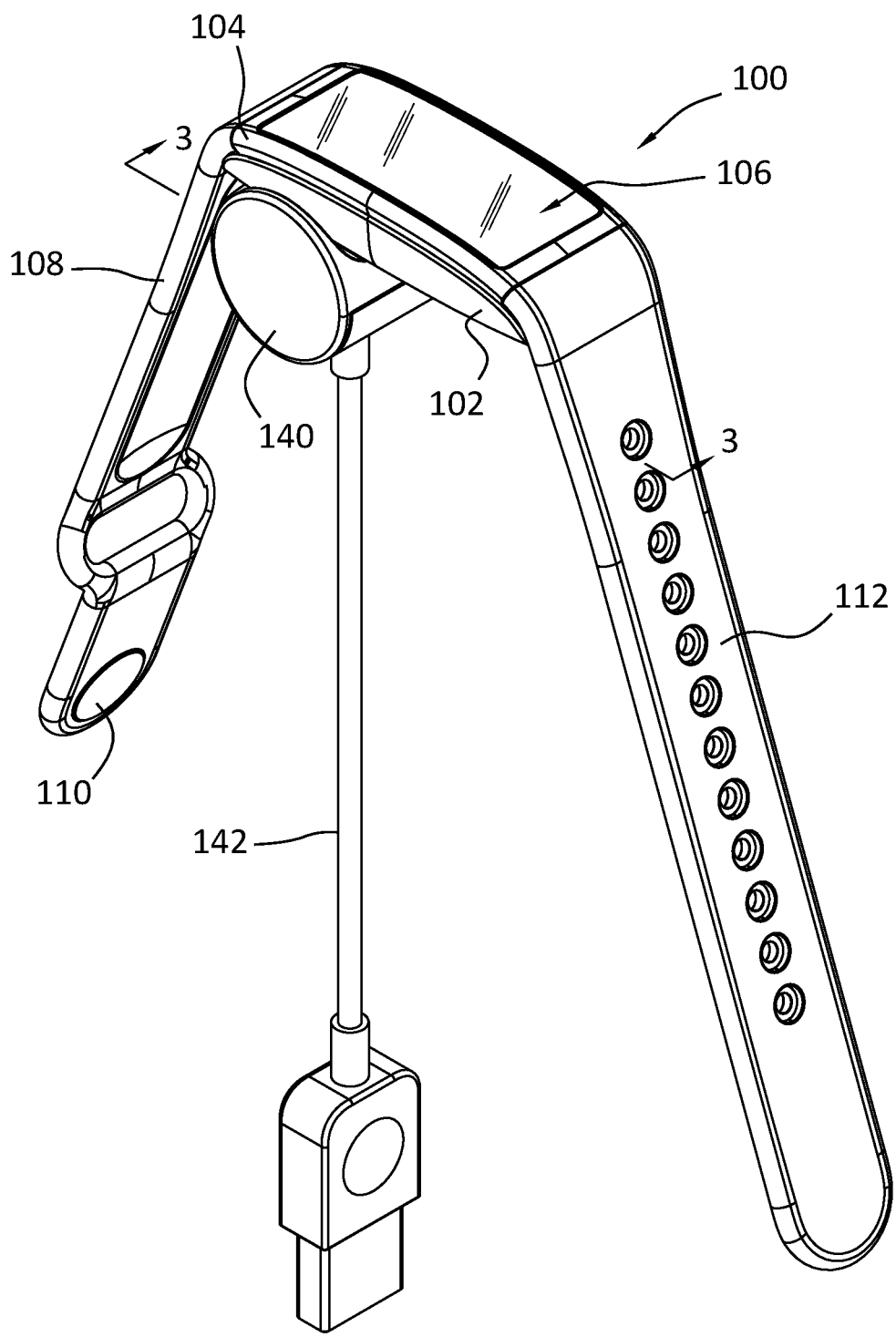
FIG. 1 is an illustrative system comprising a wearable device with a housing and a field replaceable band, and a charger, according to one implementation.

While implementations are described herein by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean "including, but not limited to".

The structures depicted in the following figures are not necessarily according to scale. Furthermore, the proportionality of one component to another may change with different implementations. In some illustrations the scale or a proportionate size of one structure may be exaggerated with respect to another to facilitate illustration, and not necessarily as a limitation.

DETAILED DESCRIPTION

A wearable device may be used to provide a variety of functions to a user. These functions may include providing information, acquiring data using sensors, and so forth. The wearable device may operate alone or may utilize a communication link to operate in conjunction with another device such as a smartphone.

The wearable device may include output devices such as a display device, haptic buzzer that provides haptic feedback to the user, a speaker to provide audio output, a light emitting diode (LED) to provide a visual indicator, and so forth.

The sensors on the wearable device may acquire data that helps the user perform various functions. For example, the wearable device may include accelerometers, a heart rate monitor, or other sensors to acquire data about the user's activity level, physical condition, and so forth. This data may then help the user. For example, information about how much the user is moving may be compared to a goal and used to provide an output that informs the user and helps them increase their activity level.

The wearable device may include two parts: a housing and a band comprising a first portion and a second portion. The housing contains at least some of the electronics of the wearable device, such as the output devices and the sensors. The housing may be sealed to prevent water, dirt, or other foreign materials from entering the housing. A charger may be affixed to the housing to allow a battery powering the electronics to be recharged from an external power supply. Described in this disclosure are several mechanisms to facilitate the fabrication and use of the wearable device.

An elastomeric band comprising a rigid member allows a user to easily change the band used with the wearable device. For example, the user may change the band without the use of any tools and with limited physical dexterity. In comparison, traditional mechanisms for affixing a band to a device may utilize various arrangements, such as spring-loaded pins or other arrangements that require the use of tools and significant dexterity to join or separate the band from the device. As a result, a user may be unable to easily change the band, limiting the frequency and utility of the wearable device.

The wearable device may include a temperature probe including a thermally conductive member that is in physical contact with a portion of the user. This results in improved performance in determining the temperature of the user while using a housing made of a material that is less thermally conductive, such as plastic. The fabrication of a plastic housing may be less expensive than a metallic housing. The thermally conductive member may be affixed during injection molding, reducing cost during assembly while also providing a seal to prevent contaminants from entering the housing.

The sensors in the housing may include optical sensors, such as optical emitters and optical detectors. It may be necessary to prevent light leakage between these devices. For example, stray light from the emitter may need to be prevented from reaching the detector. The housing may be constructed to provide an optical baffle between optical emitters and optical detectors, preventing light leakage between the two. For example, the housing may have an inner structure comprising optically transparent plastic while an outer structure that forms the exterior of the housing comprises optically opaque plastic. The housing may be fabricated as a two-shot injection process, with the inner structure formed first, and the outer structure overmolded onto the inner structure. This combined structure forms windows for the optical sensors to operate, and optical baffles to prevent light leakage between the optical components in the wearable device. By preventing light leakage, performance of the optical sensors is improved.

An antenna carrier structure may comprise an antenna that maintains electrical contact with a circuit board using one or more spring clips. The antenna carrier structure is retained to the inner structure by one or more mechanical fasteners, such as screws. The mechanical force provided by the fasteners maintains electrical contact between the spring clips and the antenna carrier structure while preventing the spring force from the spring clips from pushing against an upper portion of the housing. During assembly, the upper housing may be attached to the lower housing. By having the antenna carrier structure restrained, this attachment is made substantially easier. For example, if an adhesive is used to attach the upper housing to the lower housing, clamping time is substantially reduced, compared to designs in which the antenna carrier structure is not mechanically restrained. This reduces overall production cost and improves reliability of the seal between the upper housing and the lower housing.

The housing of the wearable device includes electrical contacts to facilitate charging. The charger is affixed to the housing by mechanically engaging a pair of engagement features into a pair of recesses in the housing. Once engaged, pogo pins or other types of contacts provide electrical connectivity between the charger and the electrical contacts on the housing. The use of the mechanical engagement features allows for the charger to be less expensive to produce and physically more compact.

By using these and other features described in this disclosure, the wearable device is able to be manufactured at lower cost while providing enhanced usability. This allows more users to enjoy the benefits of a wearable device.

Illustrative System

FIG. 1 is an illustrative view of a wearable device 100, according to one implementation. The wearable device 100 comprises a housing comprising a lower housing 102 and an upper housing 104. The wearable device 100 may also include a display 106.

The lower housing 102 and the upper housing 104 may be joined such that the resulting body is sealed. In the implementation shown here, an upper surface of the upper housing 104 is curved. During wear, the upper surface of the upper housing 104 faces away from the portion of the user to which the wearable device 100 is retained. A lower surface of the lower housing 102 is proximate to the portion of the user. For example, at least a portion of the lower surface may be in contact with the user while the wearable device 100 is being worn. The lower housing 102, the upper housing 104, and other components may comprise one or more of a metal, plastic, composite, ceramic, and so forth.

A band may be used to secure the wearable device 100 to the user. In some implementations a bottom surface of the housing may be in contact with the user's skin. A band comprising a first portion 108 having a latch 110 and a second portion 112 are shown. The latch 110 is used to secure the first portion 108 to the second portion 112, securing the wearable device 100 to the user.

Various sizes and types of band may be used, allowing for the housing to be worn on an arm, leg, abdomen, neck, and so forth. For example, the wearable device may be worn as a wristband, with the band holding the housing near the user's wrist. In another example, the wearable device may be worn as an anklet, with the band holding the housing near the user's ankle.

The band may comprise one or more flexible members. The flexible member may comprise one or more of fabric, an elastomeric material, a plurality of links, and so forth. For example, the flexible member may comprise silicone rubber. The first portion 108 of the band has a first end affixed to a first end of the lower housing 102. The second portion 112 has a second end affixed to a second end of the lower housing 102. The band is field replaceable without tools. For example, a user may remove or attach one or more of the first portion 108 or the second portion 112 from the lower housing 102.

Different bands may be chosen for one or more of aesthetic or functional reasons depending on the situation. For example, a band that is waterproof may be selected when the user expects to be in a wet environment. In another example, a band that is decorative may be selected when the user is going to be socializing. In another example, a band made from a specific material may be selected by a user to avoid contact dermatitis. In still another example, a band may become worn and require replacement.

Figure 3:
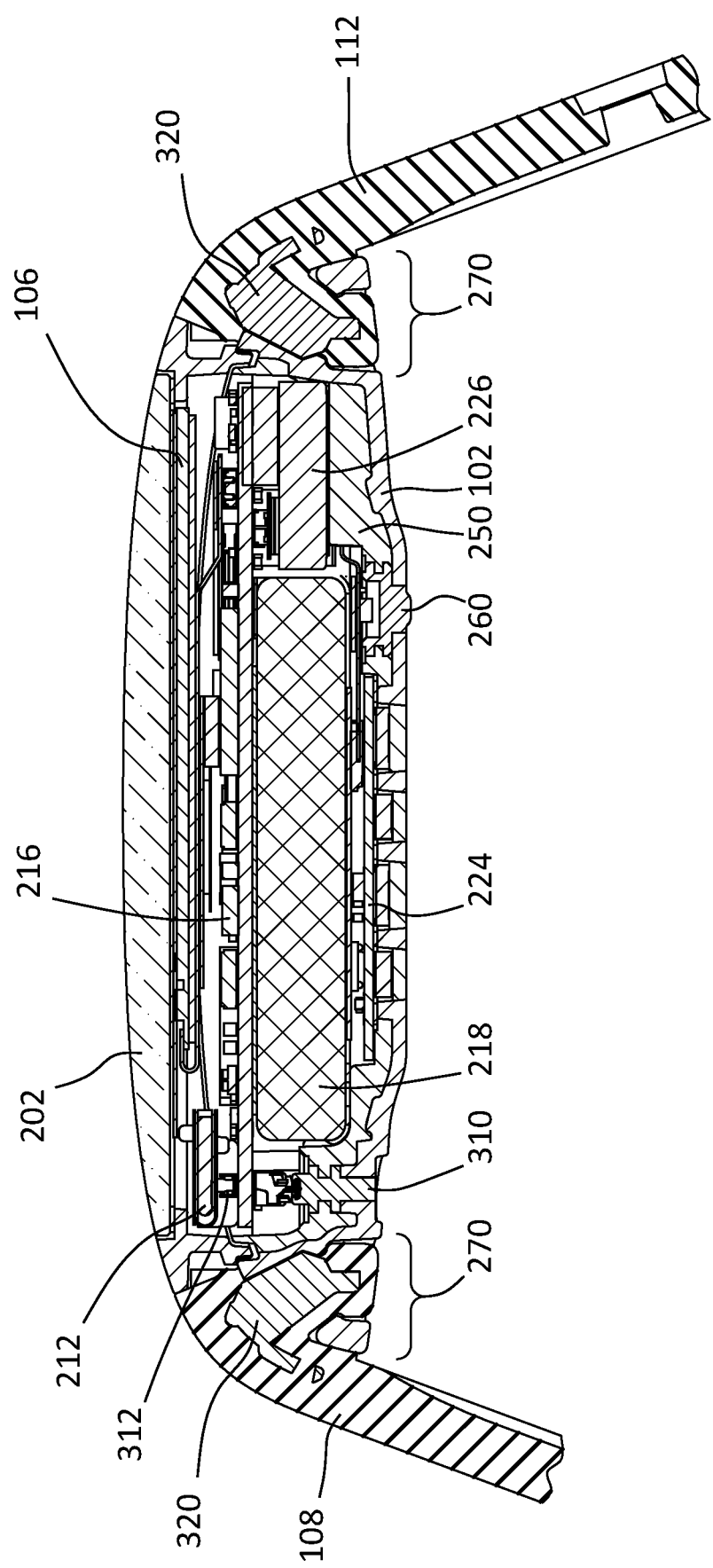
FIG. 3 is a cross-sectional view of a portion of the wearable device, according to one implementation.

A charger 140 is also shown attached to the lower housing 102. A cord 142 extends from the charger 140. For example, the cord 142 may provide an electrical connection between the charger 140 and an external device, such as a power supply. The charger 140 may be used to recharge an internal power supply of the wearable device 100, such as a battery, capacitor, and so forth. A cross-section of the wearable device 100 (excluding the charger 140) is shown at FIG. 3. The charger 140 is physically small, relative to the housing. As described herein, the charger 140 may be mechanically engaged to the lower housing 102 during use and disengaged when not in use.

Figure 2:
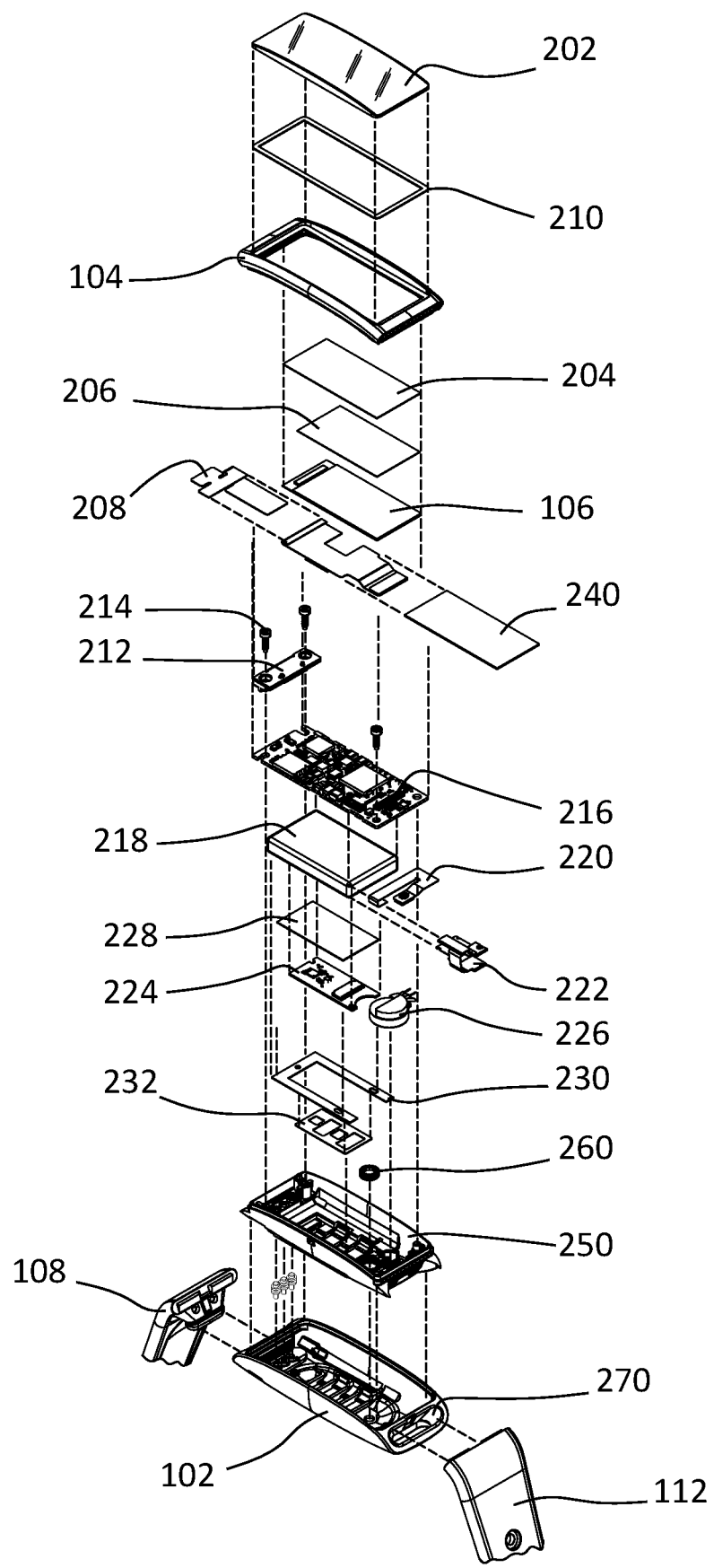
FIG. 2 is an exploded view of the wearable device, according to one implementation.

FIG. 2 is an exploded view of the wearable device, according to one implementation. An external display cover 202 is shown. The external display cover 202 is transparent, allowing the user to see the display 106. The external display cover 202 is affixed to the upper housing 104. For example, the external display cover 202 may be attached using one or more mechanical engagement features, adhesives, and so forth. In one implementation, an adhesive tape 210 may be used to join the external display cover 202 to the upper housing 104. The adhesive tape 210 may comprise an acrylic adhesive and conformable acrylic foam core.

In some implementations, the external display cover 202 and the upper housing 104 may be fabricated using a two-shot injection molding process. For example, the external display cover 202 may be formed first using an optically transparent resin, and the upper housing 104 comprising an optically opaque resin may be at least partially overmolded onto the external display cover 202.

An optically clear adhesive (OCA) 204 may be used to join a lower surface of the external display cover 202 and to an upper portion 206 of the display 106. One or more flexible printed circuits 208 may provide electrical connectivity between the display 106 and other components, such as the circuit board 216. A layer of foam 240 may be provided beneath the display 106 and above the circuit board 216. In some implementations the foam 240 may include an adhesive.

The circuit board 216 may comprise one or more components, including one or more processors, memory, communication interface, and so forth. An antenna carrier 212 comprises a structure and one or more conductive elements that serve as an antenna for the communication interface. One or more mechanical fasteners 214 join the antenna carrier 212 to an inner structure 250. These one or more mechanical fasteners 214 may pass through the circuit board 216. The mechanical force provided by the mechanical fasteners 214 maintains electrical contact between the one or more conductive elements of the antenna carrier 212 and one or more electrical contacts on an upper surface of the circuit board 216. This is described in more detail herein.

A power supply, such as a rechargeable battery 218, is positioned below the circuit board 216. A flexible printed circuit 220 provides electrical connectivity between the circuit board 216 and a primary battery 226. A flexible printed circuit 222 provides electrical connectivity between the circuit board 216 and a sensor circuit board 224.

The sensor circuit board 224 may comprise one or more sensors. These may include a temperature sensor and one or optical sensors. The optical sensors may include an optical emitter ("emitter") that emits light and an optical detector ("detector") that detects light. For example, the optical sensors may comprise a heart rate monitor (HRM). The HRM may emit light that impinges on a portion of the user while the wearable device 100 is being worn. The detector may detect a portion of that light as reflected, scattered, absorbed and remitted, and so forth. Information about the detected light may be used to determine heart rate, oxygen saturation, and so forth. Stray light leakage between the emitter and the detector would impair operation of the optical sensor. For example, if no barrier was present between the emitter and detector, the detector may be overloaded with the light emitted by the emitter and may be unable to detect the fainter signal of the reflected light. By providing an optical barrier and maintaining optical isolation between the emitter and detector, operation of the optical sensor is improved. The inner structure 250 and the lower housing 102 provide optical baffles that prevent stray light leakage. These are discussed in more detail herein.

A layer of foam 228 may be provided between the underside of the rechargeable battery 218 and an upper surface of the sensor circuit board 224. In some implementations the foam 228 may include an adhesive.

In one implementation, an adhesive tape 230 may be used to join the rechargeable battery to the inner structure 250. The adhesive tape 230 may comprise an acrylic adhesive and conformable acrylic foam core.

A seal 232 may be positioned between the underside of the sensor circuit board 224 and an upper surface of the inner structure 250. The seal 232 may prevent light leakage between optical elements on the sensor circuit board 224.

A thermally conductive element 260 provides a thermally conductive pathway between an exterior of the wearable device 100 and a temperature sensor within the housing. For example, the thermally conductive element 260 may comprise metal. In some implementations the lower housing 102 may comprise a material that is a relatively poor thermal conductor, such as plastic. During wear, a distal end of the thermally conductive element 260 may be in contact with or is proximate to a portion of the user. Heat from the user is conducted along the thermally conductive element 260 to a proximal end that has a temperature sensor attached. The temperature sensor provides a signal indicative of temperature. For example, the temperature sensor may comprise a thermocouple.

The thermally conductive element 260 may be inserted into the inner structure 250 during fabrication. For example, the inner structure may be injection molded around thermally conductive element 260. The arrangement of the thermally conductive element 260 is discussed in more detail herein.

The inner structure 250 is disposed within the lower housing 102. The fabrication and configuration of these components are discussed in more detail herein. The lower housing 102 includes one or more receptacles 270. The receptacles 270 provide attachment points for the band. For example, a first receptacle 270 at a first end of the lower housing 102 is used to attach the first portion 108 of the band and a second receptacle 270 at a second end of the lower housing 102 is used to attach the second portion 112 of the band.

FIG. 3 is a cross-sectional view of a portion of the wearable device along line 3-3 as indicated in FIG. 1, according to one implementation. Within the housing the antenna carrier 212 is visible. A spring contact 312 is shown, that provides an electrically conductive pathway between an antenna on the antenna carrier 212 and an electrical contact on the circuit board 216.

Also visible is the display 106 arranged beneath the external display cover 202. The first portion 108 of the band is shown attached to the first receptacle 270 at a first end of the lower housing 102. The second portion 112 of the band is shown attached to the second receptacle 270 at a second end of the lower housing 102. Each portion of the band includes a rigid member 320. The rigid member 320 is proximate to an end of the portion of the band that is disposed within the receptacle 270 when the portion of the band is attached to the lower housing 102. The rigid member 320 is discussed in more detail herein.

An electrical contact 310 is visible. The electrical contact 310 provides an electrically conducive pathway between an exterior of the lower housing 102 and the electronics within the housing, such as the electronics on the circuit board 216. The electrical contact 310 may be used when the charger 140 is affixed to the wearable device 100.

The inner structure 250 is shown, as is the lower housing 102. The inner structure 250 may comprise an optically transparent material while the lower housing 102 may comprise an optically opaque material. The transparency and opaqueness may be determined with respect to the optical sensors on the sensor circuit board 224. For example, if the optical sensors use green light, the optically transparent material passes green light while the optically opaque material blocks green light.

Also shown is the thermally conductive element 260. A distal end of the thermally conductive element 260 may be rounded, and may come into physical contact with the user while the wearable device 100 is being worn.

Figure 4:
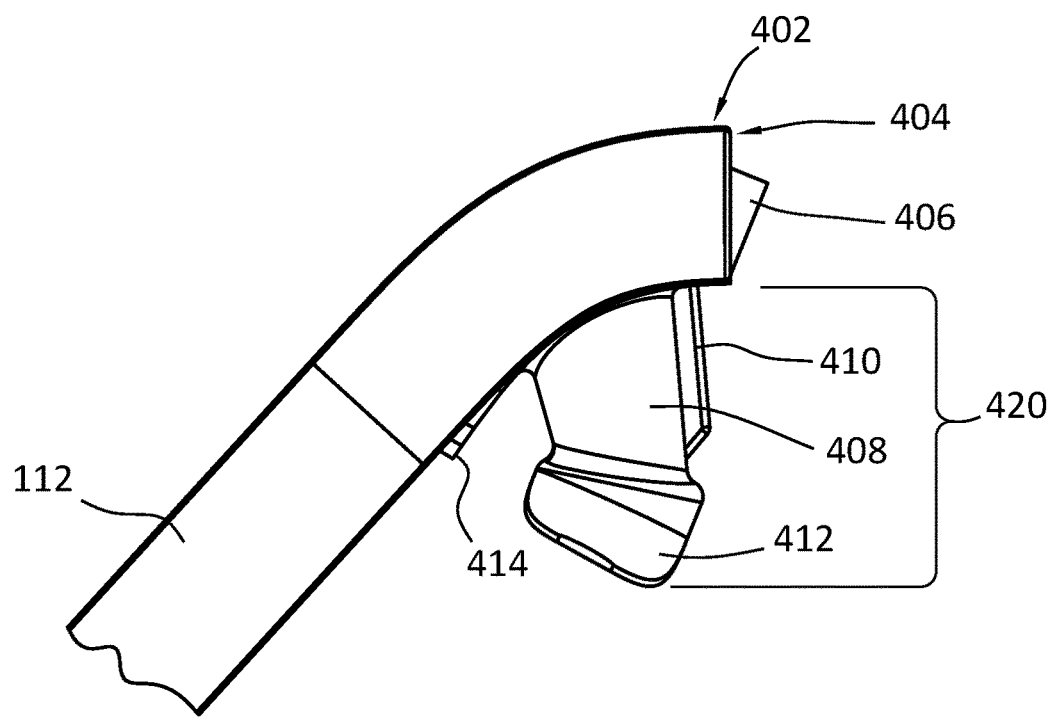
FIG. 4 is a side view showing features of a band that allow the band to be attached to the housing of the wearable device, according to one implementation.

FIG. 4 is a side view showing features of a portion of a band that allow the portion of the band to be attached to the lower housing 102 of the wearable device 100, according to one implementation. In this view the second portion 112 of the band is shown with a protrusion 420 that is used to mechanically engage the second portion 112 to the receptacle 270. The same or a similar structure may be used on the first portion 108.

Each protrusion 420 is configured to maintain mechanical engagement after insertion into the receptacle 270. The protrusions 420 may comprise an elastomeric material. In one implementation, the protrusions 420 may comprise silicone rubber having a hardness as measured using a durometer with a Shore A reading of between 70 and 90.

In one implementation, the protrusions 420 may comprise components that have been joined to the flexible member. For example, the protrusions 420 may be formed and then joined to the flexible member using one or more of an adhesive, mechanical fasteners, thread, and so forth.

In another implementation the protrusions 420 may be integral with at least a portion of the flexible member. For example, the flexible member and the protrusions 420 may comprise a unitary piece of elastomeric material.

A portion of each protrusion 420 is larger than the narrowest part of the receptacle 270. For example, a first distance D1 indicates the maximum width of an upper opening in the receptacle 270. A second distance D2 indicates the maximum width a lower opening in the receptacle 270. In some implementations, the first distance D1 may be greater than the second distance D2. The receptacle 270 may have a narrowed or constricted portion that has a maximum width of a third distance D3.

A fourth distance indicates the maximum width of the protrusion 420 at its widest point. The fourth distance is greater than the third distance D3. For example, at the widest point the enlarged tip of the protrusion 420 is larger than the narrowest point in the receptacle 270.

In one implementation the fourth distance may be less than the first distance D1. For example, the widest point of the protrusion 420 may be smaller than the upper opening of the receptacle 270. In another implementation the uncompressed protrusion 420 may have a fourth distance that is greater than the second distance D2. For example, after insertion into the receptacle 270 the protrusion 420 may expand and exert some pressure on the interior surface of the receptacle 270 as the elastomeric material attempts to resume a prior shape. In this implementation the portion of the protrusion 420 that is within the receptacle 270 remains at least slightly compressed.

In the implementation depicted here, the band is affixed to the lower housing 102 by aligning a protrusion 420 to a respective receptacle 270 and a force is applied to the flexible member on the outer surface opposite the protrusion 420. The applied force causes the enlarged portion of the protrusion 420 to temporarily deform, allowing it to pass into the receptacle 270. Once within the receptacle 270 and past the retention ridge or other constriction within the receptacle 270, the elastomeric material expands, securing part of the protrusion 420 within the receptacle 270. The portion of the band is now affixed to the lower housing 102.

To separate the band from the lower housing 102, the process is reversed. A pull may be applied to the flexible member of the portion of the band. Under the influence of the pull, the protrusion 420 temporarily deforms and is able to be withdrawn from the receptacle 270.

In one implementation, the one or more receptacles 270 in the lower housing 102 may be configured with the same dimensions. Likewise, the one or more protrusions 420 on the band may be configured with the same dimensions. In this implementation, the relative orientation of the lower housing 102 with respect to the band may be easily changed. For example, a left-handed user may wish to reverse the orientation of the lower housing 102 with respect to the band to allow improved access to one or more controls on the lower housing 102. In other implementations, the dimensions of one or more of the receptacles 270 or the protrusions 420 may differ, enforcing a particular orientation of the band with respect to the lower housing 102.

An upper surface 402 is shown. This upper surface 402 may be flush with the upper housing 104 when the band is affixed to the wearable device 100. A first face 404 is proximate to the upper housing 104 when the band is affixed to the wearable device 100. A portion of the band may extend to produce a first protrusion 406 that extends into a corresponding cavity in the housing of the wearable device 100.

The protrusion 420 extends from the band, the protrusion 420 comprising a stalk 408 and having a tip 412. A protuberance 410 comprising a portion of the rigid member 320 may extend from the stalk 408, extending towards the housing of the wearable device 100. The protuberance 410 may comprise the rigid member 320, uncovered by elastomeric material.

A portion of the band may be formed into a ridge 414 on an underside of the second portion 112, on a side of the stalk 408 that is opposite the protuberance 410.

Figure 5:
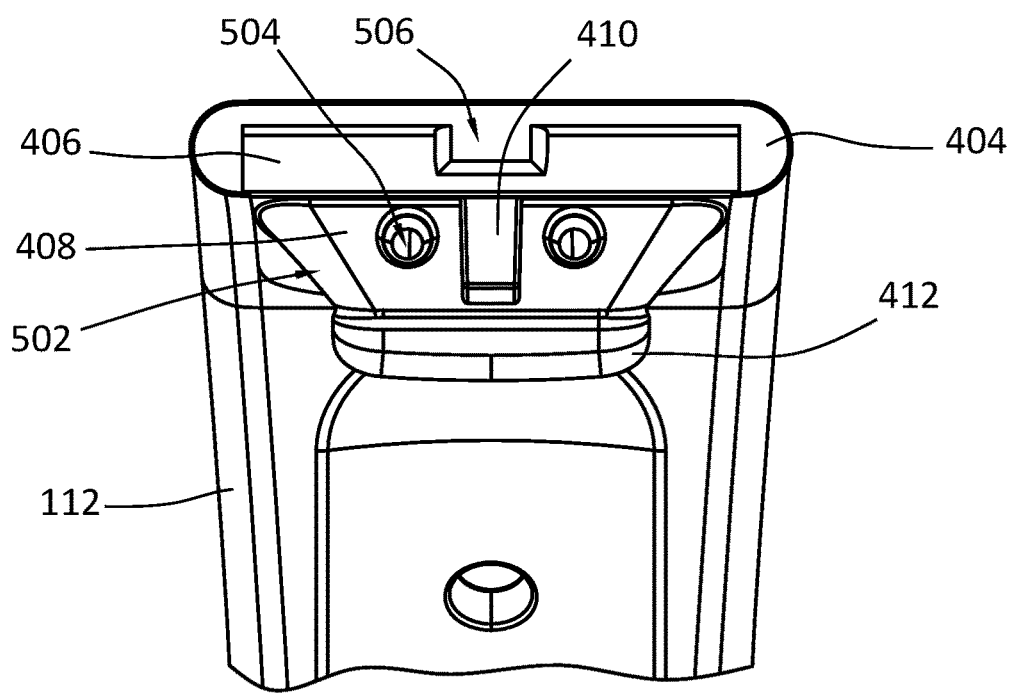
FIG. 5 is a front view showing features of the band that allow the band to be attached to the housing of the wearable device, according to one implementation.

FIG. 5 is a front view showing features of the band that allow the band to be attached to the lower housing 102 of the wearable device 100, according to one implementation. In this view, the first protrusion 406 is visible on the first face 404. The first protrusion 406 forms a notch 506. The notch 506 may facilitate alignment and prevent slippage of the band once mechanically engaged to the wearable device 100.

The protuberance 410 of the rigid member 320 is also shown extending from the stalk 408. The stalk 408 tapers 502 from a first width at the band to a second width proximate to the tip 412. The first width is greater than the second width. The tip 412 of the stalk 408 is enlarged relative to a narrowest portion of the taper 502.

One or more holes 504 are shown in the elastomer material that conceals the rigid member 320. These holes 504 may facilitate fabrication, reduce the force needed to insert or remove the band, and so forth. For example, the holes 504 may be used to maintain positioning of the rigid member 320 during overmolding of the elastomeric material of the band. In another example the holes 504 may provide a localized reduction in the amount of elastomeric material, allowing for easier deformation upon insertion or removal of the band to the receptacle 270.

Figure 6:
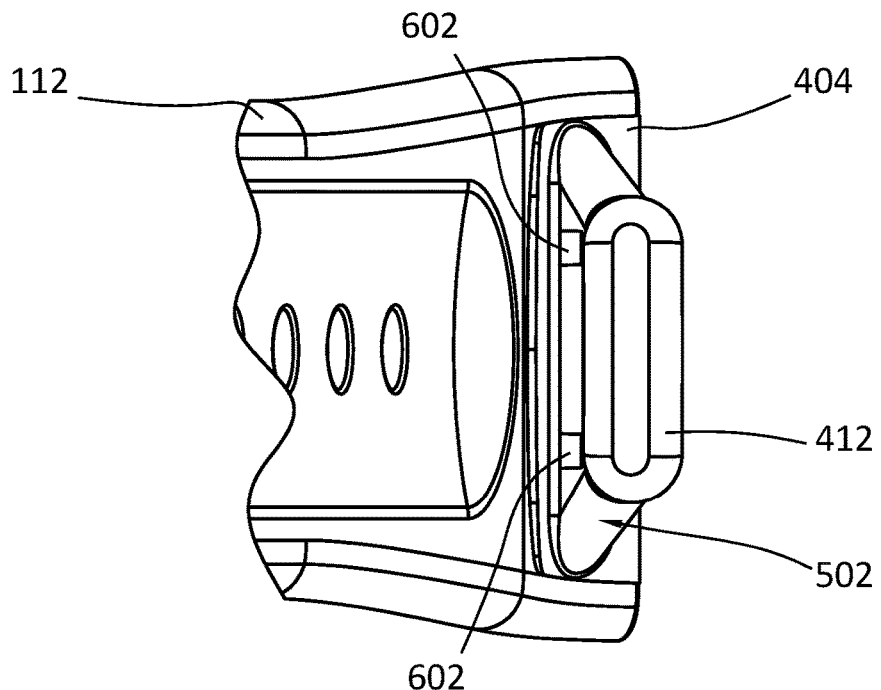
FIG. 6 is an underside view showing features of the band that allow the band to be attached to the housing of the wearable device, according to one implementation.

FIG. 6 is an underside view showing features of the band that allow the band to be attached to the housing of the wearable device 100, according to one implementation. In this view, a first contact portion 602 and a second contact portion 602 are shown on a side of the stalk 408 that is opposite the wearable device 100. The first contact portion 602 and the second contact portion 602 comprise a portion of the rigid member 320 that is uncovered by elastomeric material. The first contact portion 602 and the second contact portion 602 may facilitate alignment and engagement by providing a mechanical stop against the pressure provided by compressed elastomeric material located between the rigid member 320 and the housing.

Figure 7:
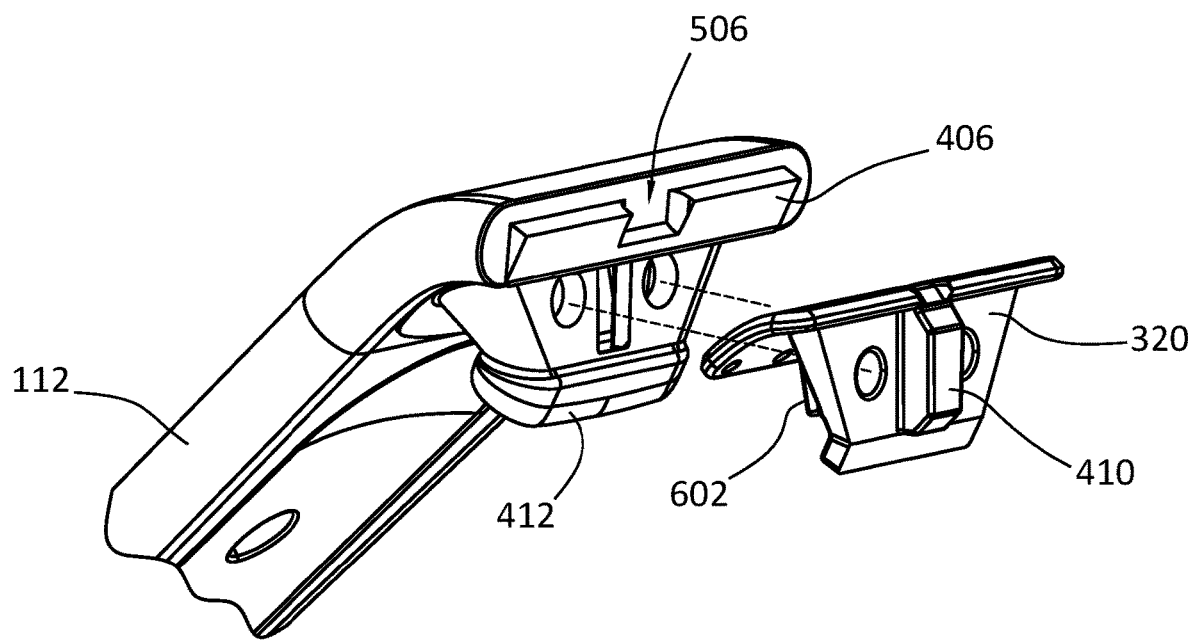
FIG. 7 is a first perspective view showing a rigid member within the band, according to one implementation.

FIG. 7 is a first perspective view showing a rigid member 320 within the band, according to one implementation. In this view, the rigid member 320 is shown separated from the band, to reveal various features. Shown is a portion of the second contact portion 602 and the protuberance 410.

Figure 8:
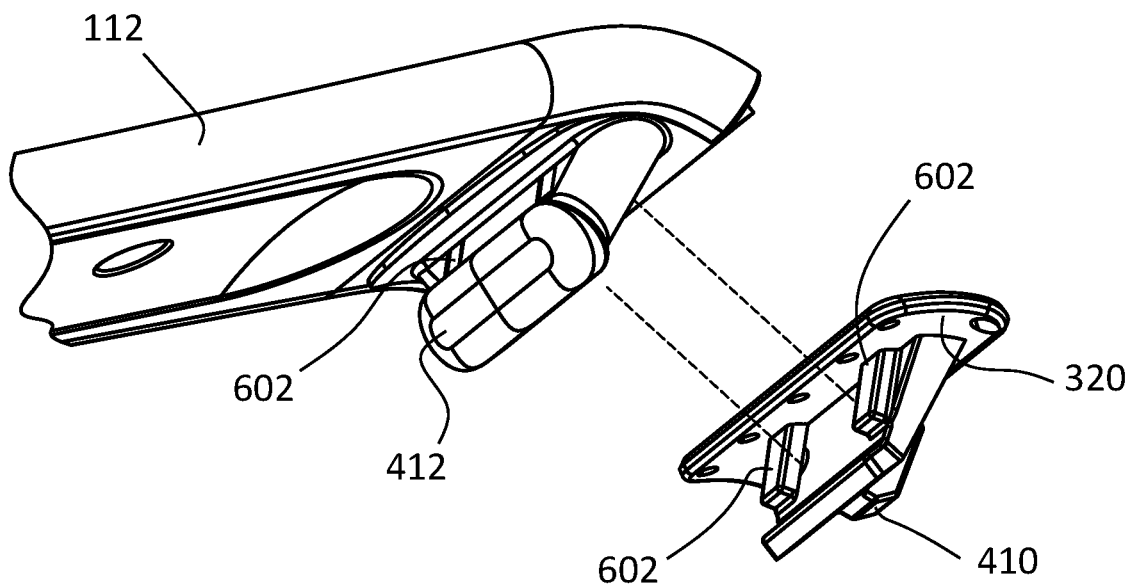
FIG. 8 is a second perspective view showing a rigid member within the band, according to one implementation.

FIG. 8 is a second perspective view showing a rigid member 320 within the band, according to one implementation. In this view, the rigid member 320 is shown separated from the band, to reveal various features. Shown is the first contact portion 602 and the second contact portion 602, as well as part of the protuberance 410.

Figure 9:
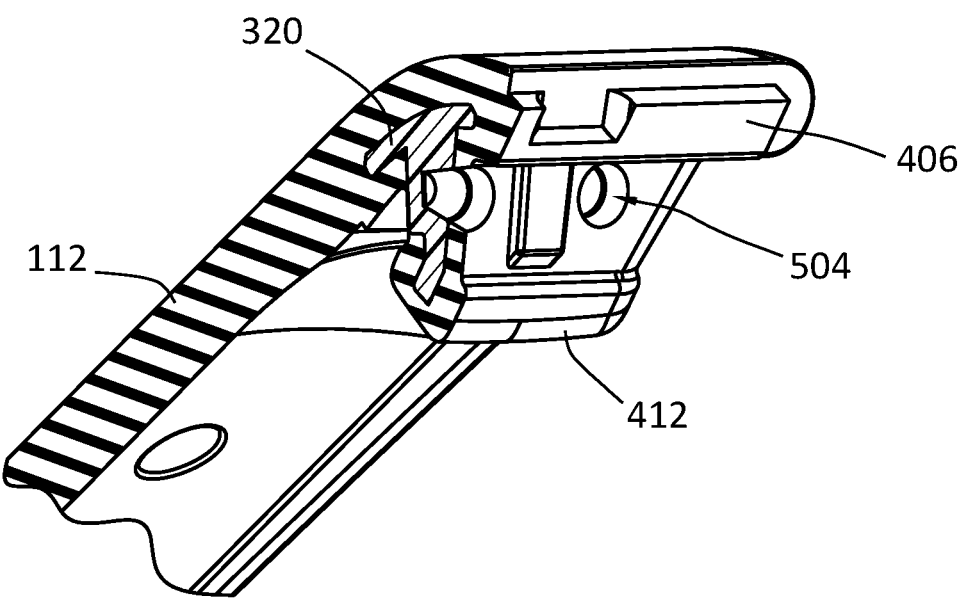
FIG. 9 is a cross-section of a perspective view showing the rigid member within the band, according to one implementation.

FIG. 9 is a cross-section of a perspective view showing the rigid member 320 within the band, according to one implementation. In this view, the holes 504 are shown. The holes 504 pass through the elastomeric overmolding but do not pass through the rigid member 320.

Figure 10:
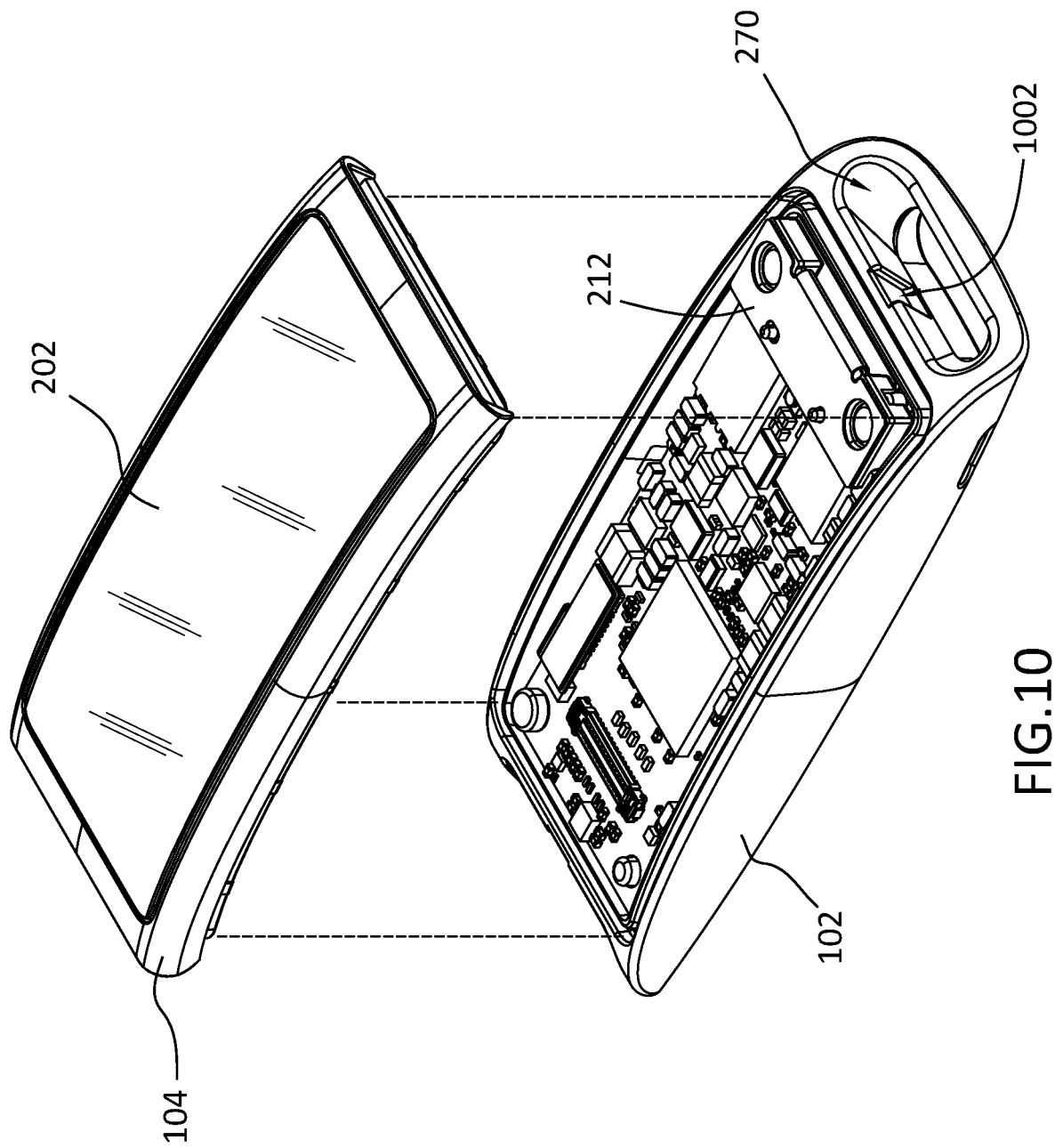
FIG. 10 shows an upper housing, a lower housing, and some internal components of the wearable device, according to one implementation.

FIG. 10 shows the upper housing 104, the lower housing 102, and some internal components of the wearable device 100, according to one implementation. The external display cover 202 is shown affixed to the upper housing 104. In this view, the antenna carrier 212 is shown, affixed to the inner structure 250 using the one or more fasteners 214. By mounting in this way, the spring force produced by the spring contacts 312 does not apply a mechanical pressure on the upper housing 104. This facilitates assembly of the wearable device 100 by reducing or eliminating the need for clamping.

One of the receptacles 270 is visible. Within the receptacle 270 a notch 1002 is shown. When the band is affixed, the protuberance 410 on the stalk 408 is disposed within this notch 1002. The receptacle 270 is open on two ends. An upper opening has a first width, and the receptacle 270 tapers to a second width that is less than the first width, with a retention ridge or other feature on an interior of the receptacle 270. The receptacle 270 may then continue, to a third width at a lower opening. A passageway extends between the upper opening and the lower opening. The third width is greater than the second width, but may be less than the first width.

Figure 11:
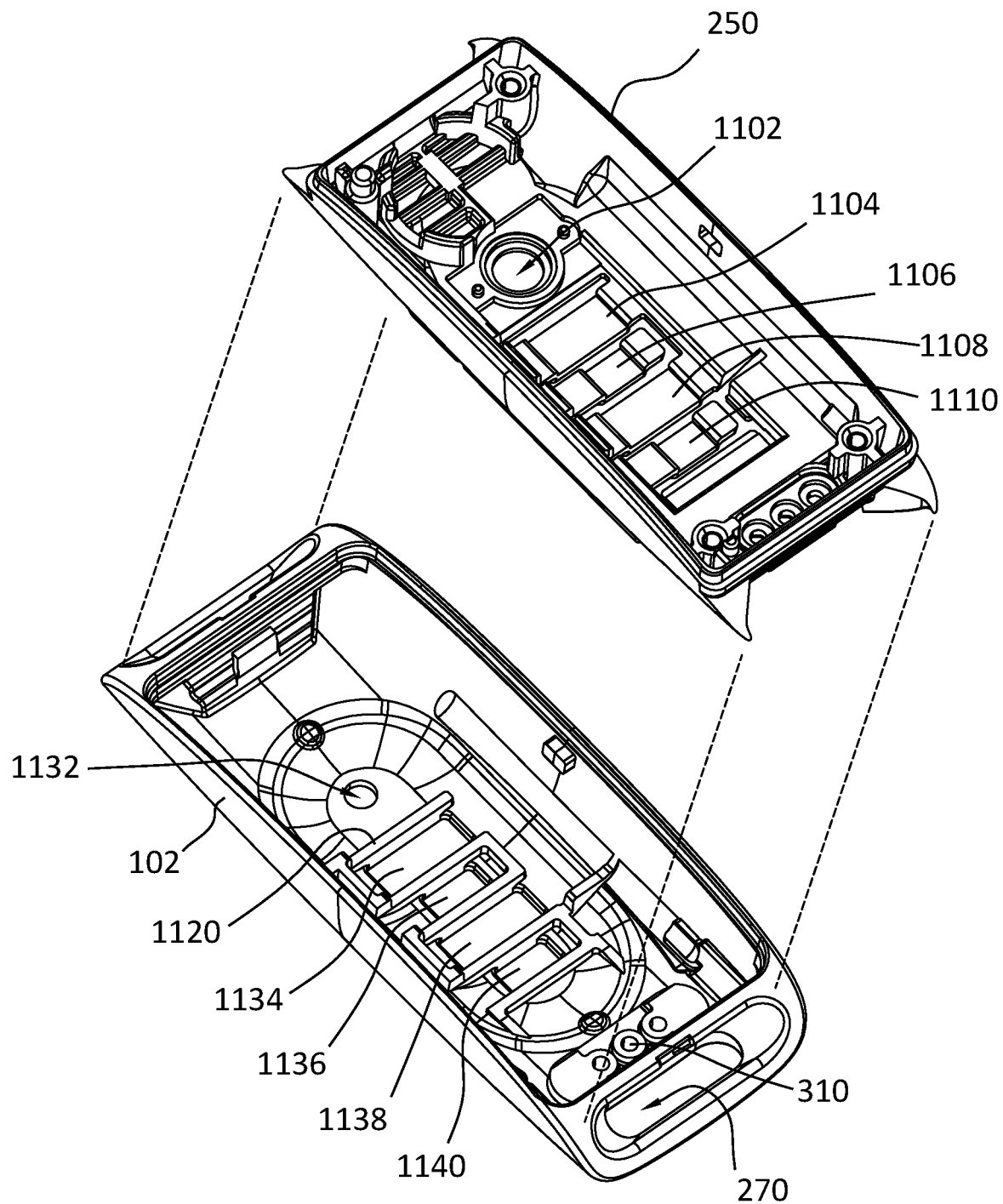
FIG. 11 shows a view of a lower housing and an inner structure configured to facilitate operation of optical devices, according to one implementation.

FIG. 11 shows a first view of the lower housing 102 and the inner structure 250 that facilitates operation of optical devices by providing optical baffles and optical windows, according to one implementation.

The lower housing 102 and the inner structure 250 may be formed using injection molding techniques. For example, the inner structure 250 may be formed first, and the lower housing 102 may be overmolded or formed second. The inner structure 250 may comprise an optically transparent material while the lower housing 102 that forms the exterior of the housing comprises an optically opaque material. The optically transparent material may be transmissive to a first wavelength of light, while the optically opaque material is opaque to the first wavelength. The optically transparent material may transmit or pass incident light while the optically opaque material blocks incident light.

The inner structure 250 may comprise an aperture 1102. At least a portion of the thermally conductive element 260 may be disposed within the aperture 1102.

The inner structure 250 may also include a plurality of tabs or extensions that provide windows for optical sensors on the sensor circuit board 224 to operate. In this illustration, the inner structure 250 includes a first window portion 1104, a second window portion 1106, a third window portion 1108, and a fourth window portion 1110. Each of these window portions comprise a portion of the inner structure 250 that forms a tab, attached on one side, and free on the remaining sides. The part of the window portion that is attached to the remaining inner structure 250 alternates from one side of the inner structure 250 to the other. This alternating attachment provides a serpentine opening in the inner structure 250 between the adjacent window portions. Because the inner structure 250 may be comprised of an optically transparent material, the window portions operate as windows through which light to or from optical devices on the sensor circuit board 224 may pass.

The lower housing 102 is shown. The lower housing 102 provides the exterior of the housing of the wearable device 100. The lower housing 102 may comprise an aperture 1132. At least a portion of the thermally conductive element 260 may be disposed within the aperture 1132. The aperture 1102 may have a first width while the aperture 1132 has a second width. The first width may be greater than the second width, as shown here.

The lower housing 102 includes a plurality of apertures that provide windows for the optical sensors on the sensor circuit board 224. A first window opening 1134, a second window opening 1136, a third window opening 1138, and a fourth window opening 1140 are shown. One or more optical baffle ridges 1120 comprise features that extend from the lower housing 102 into the serpentine opening provided by the inner structure 250. The optical baffle ridge(s) 1120 provide an optical baffle between optical elements on the sensor circuit board 224 and their corresponding windows in the housing. Once assembled or fabricated, the window portions are located at least partially within the corresponding window openings. For example, the first window portion 1104 is within the first window opening 1134, the second window portion 1106 is within the second window opening 1136, and so forth. Stated another way, the window opening may be produced by overmolding the optically opaque material around but not over the window portions.

In this illustration, the optical baffle ridge 1120 comprises a contiguous ridge in a serpentine arrangement, matching the corresponding opening between the window portions of the inner structure 250. This serpentine structure blocks stray light from passing between the optical elements. For example, emitted light passing through the first window portion 1104 that is within the first window opening 1134 is blocked by the optical baffle ridge 1120 from leaking into an adjacent detector that is configured to detect incident light passing through the second window portion 1106 that is within the second window opening 1136. The window portions and the window openings are depicted as rectangular. In other implementations, other shapes may be used. For example, the window portions and the window openings may be circular, triangular, oval, and so forth. While four windows are depicted, other numbers of windows may be used.

In one example, the first window opening 1134 may have a first edge, a second edge, a third edge, and a fourth edge. The second window opening 1136 may have a fifth edge, a sixth edge, a seventh edge, and an eighth edge, wherein the third edge is adjacent to the fifth edge. The optical baffle ridge 1120 may extend upward from an inner surface of the lower housing 102, wherein the optical baffle ridge 1120 is adjacent to the first edge, adjacent to the fourth edge, between the third edge and the fifth edge, adjacent to the sixth edge, and adjacent to the seventh edge.

The combination of the inner structure 250 and the lower housing 102 forms windows for the optical sensors to operate and optical baffles to prevent light leakage between the optical components in the wearable device 100. By preventing light leakage, performance of the optical sensors is improved.

Figure 12:
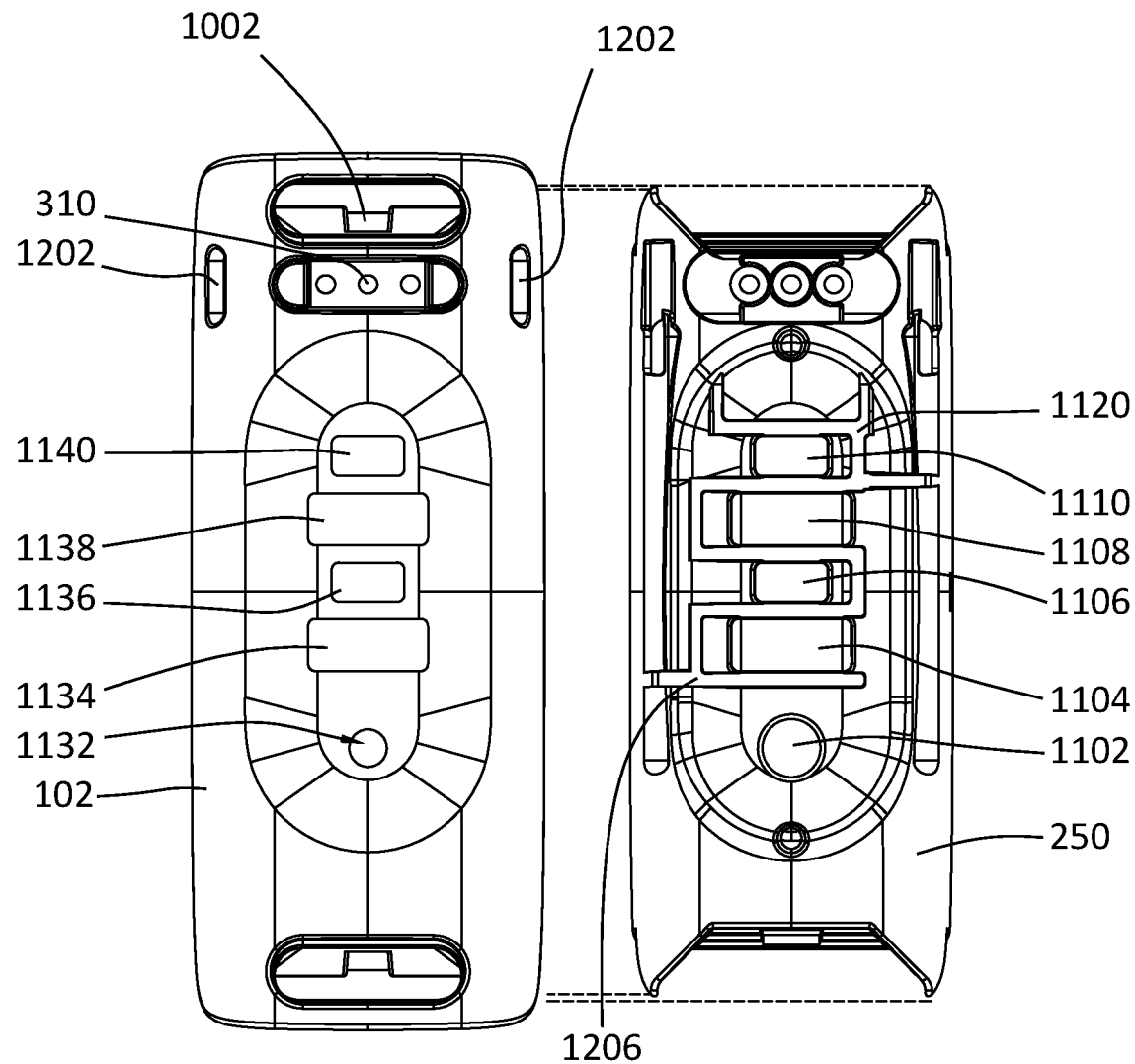
FIG. 12 shows an underside view of the outer lower housing and the inner lower housing, according to one implementation.

FIG. 12 shows an underside view of the lower housing 102 and the inner structure 250, according to one implementation. Shown here with respect to the lower housing 102 are the first window opening 1134, the second window opening 1136, the third window opening 1138, and the fourth window opening 1140. The lower housing 102 may include a pair of recesses 1202, a first recess 1202 on a first side of the lower housing 102 and a second recess 1202 on a second side of the lower housing 102. The first recess 1202 and the second recess 1202 may be opposite one another. The charger 140 may be affixed to the wearable device 102 using these recesses 1202. Also visible are the electrical contacts 310 on the exterior of the lower housing 102. In this illustration three electrical contacts 310 are depicted. In other implementations, other numbers of electrical contacts 310 may be used.

With regard to the inner structure 250 the first window portion 1104, the second window portion 1106, the third window portion 1108, and the fourth window portion 1110 are shown. The serpentine opening 1206 between the window portions is also shown.

Figure 13:
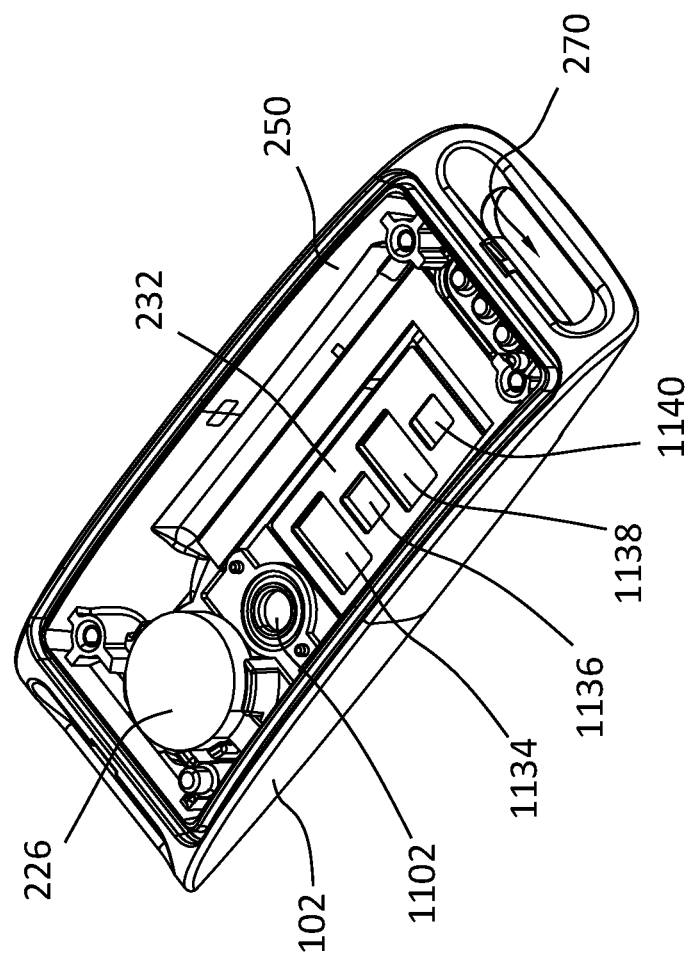
FIG. 13 shows a view of the lower housing, according to one implementation.

FIG. 13 shows another view of the lower housing 102 and the inner structure 250 combined, according to one implementation. In this view, the primary battery 226 is shown within the inner structure 250, and the seal 232 is shown above the optical baffle ridge 1120. The seal 232 may be used to further minimize like leakage between optical devices on the sensor circuit board 224.

Figure 14:
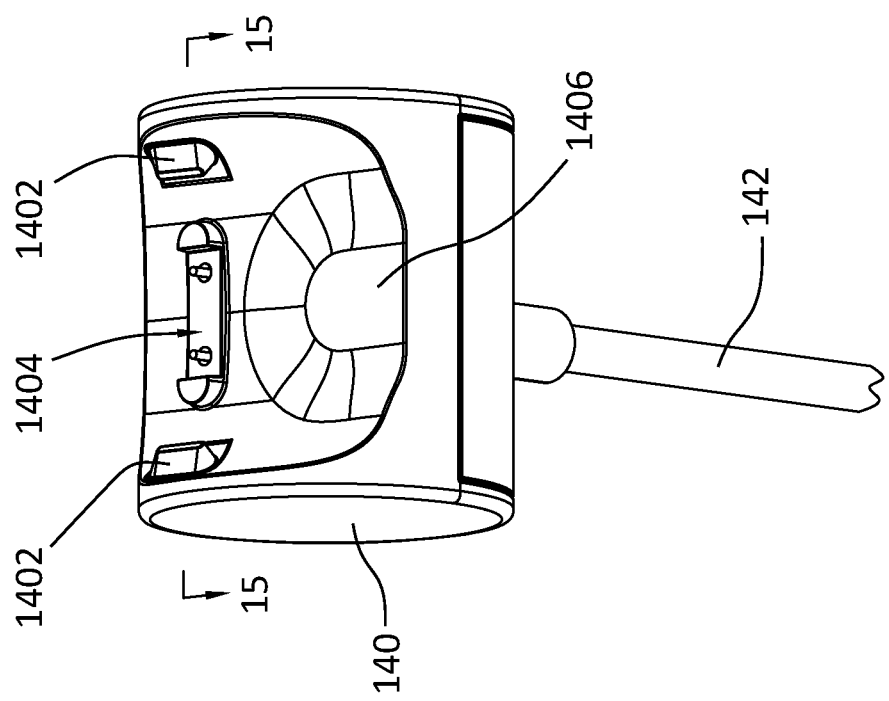
FIG. 14 shows a perspective view of the charger, according to one implementation.

FIG. 14 shows a perspective view of the charger 140, according to one implementation. The charger 140 includes one or more engagement features 1402 that mechanically engage corresponding recesses 1202 on the housing of the wearable device 100. In this illustration, the charger 140 includes a first engagement feature 1402 to engage the first recess 1202 and a second engagement feature 1402 to engage the second recess 1202.

The charger 140 may include one or more electrical contacts 1404. For example, the electrical contacts 1404 may comprise pogo pins that provide a mechanically biased electrically conductive pin. When the charger 140 is affixed to the wearable device 100, the electrical contacts 1404 establish an electrically conductive pathway with the corresponding electrical contacts 310 on the wearable device. In the implementation shown here, the one or more electrical contacts 1404 are located between the first engagement feature 1402 and the second engagement feature 1404. Once a conductive pathway is established, the charger 140 may provide electrical current to recharge the rechargeable battery 218, send signals to or receive signals from the electronics in the wearable device 100, and so forth.

The charger 140 may include a recess 1406 to accommodate the housing of the wearable device 100. The charger 140 is connected to an external power supply, source of data, or other electronic device via a cable 142. In some implementations the charger 140 may omit the electrical contacts 1404, and may use one or more of inductive, capacitive, or other wireless power transfer mechanisms.

In another implementation, not shown, the engagement features 1402 and the electrical contacts 1404 may be combined. For example, the engagement features 1402 may include an electrically conductive portion and may serve as the electrical contacts 1404. Continuing the example, the electrical contacts 310 on the wearable device 100 may be positioned within or near the recesses 1202.

Figure 15:
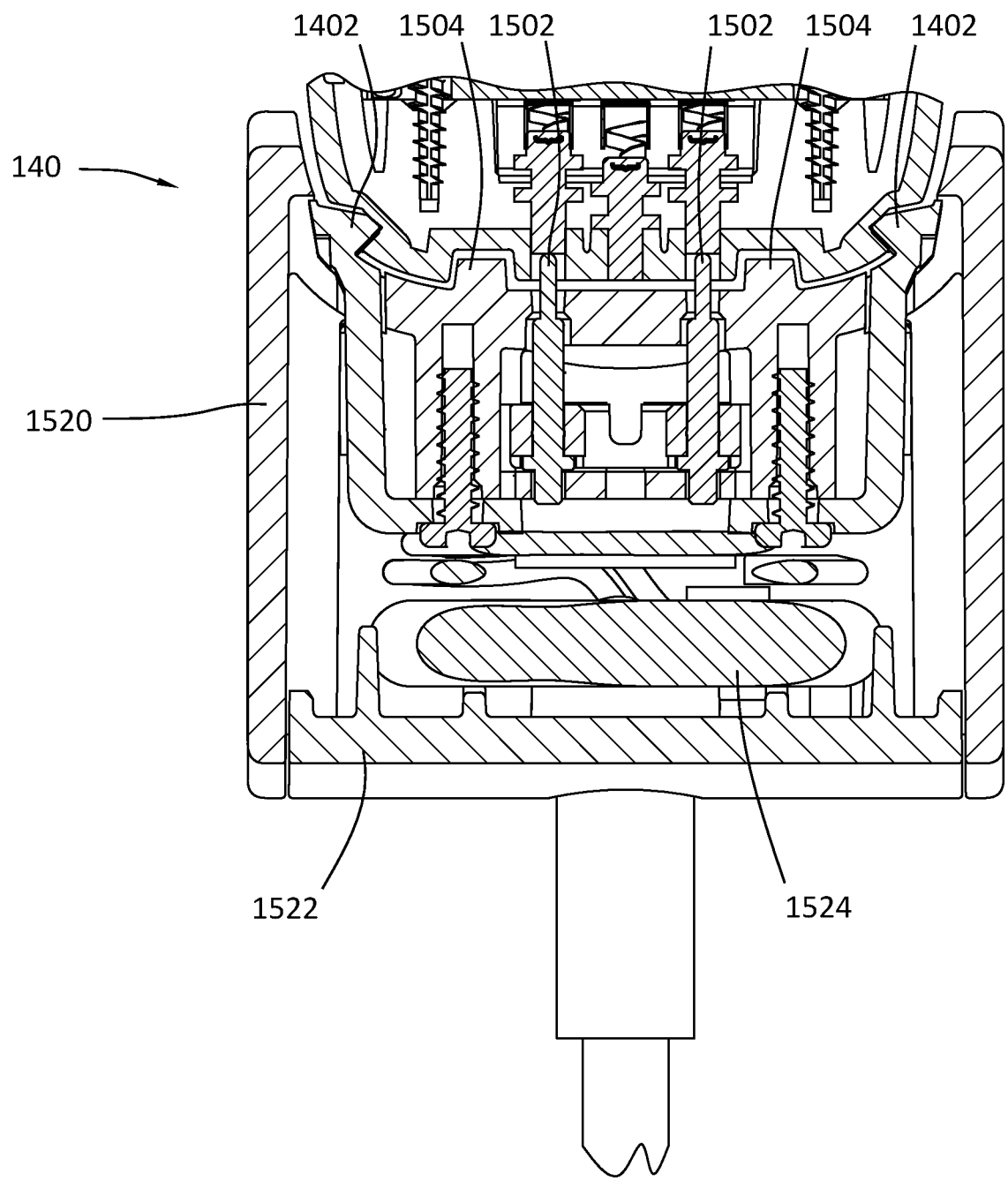
FIG. 15 shows a cross-sectional view of the charger, according to one implementation.

FIG. 15 shows a cross-sectional view of the charger 140 along line 15 as shown in FIG. 14, according to one implementation. Also shown is a portion of the housing of the wearable device 100 as engaged with the charger 140. The first engagement feature 1402 and the second engagement feature 1402 are visible. In this illustration the first engagement feature 1402 and the second engagement feature 1402 are part of a single piece that has, when viewed in this cross section, an overall "U" shape.

The electrical contacts 1404 are shown here as a first pogo pin 1502 and a second pogo ping 1502.

The charger 140 may include one or more alignment features 1504. For example, a first alignment feature 1504 is proximate to the first pogo pin 1502 while a second alignment feature 1504 is proximate to the second pogo pin 1502. The alignment feature(s) 1504 may aid in maintaining lateral alignment of the wearable device 100 with respect to the charger 140. While the charger 140 is affixed to the wearable device 100, the alignment features 1504 may be at least partially within corresponding alignment recesses in the housing of the wearable device 100.

A housing of the charger 140 may comprise charger housing sides 1520 and a charger housing bottom 1522. Electronics 1524 may be arranged within the housing of the charger 140.

Figure 16:
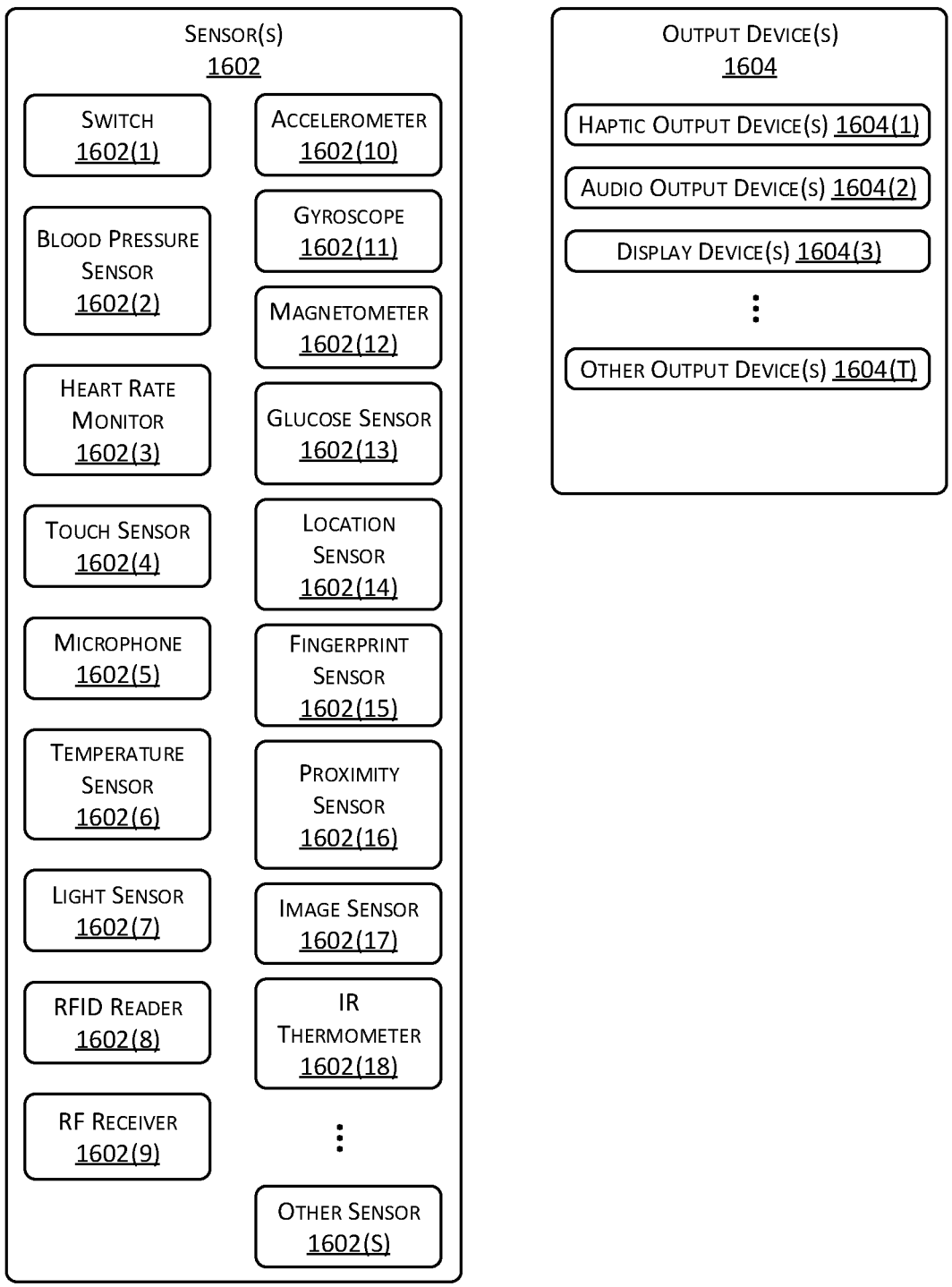
FIG. 16 illustrates a block diagram of sensors and output devices that the wearable device may utilize, according to one implementation.

FIG. 16 illustrates a block diagram of sensors and output devices that the wearable device may utilize, according to one implementation. The wearable device 100 may include one or more sensors 1602 and one or more output devices 1604.

The sensors 1602 may generate sensor data during operation. The one or more sensors 1602 may be integrated with or internal to the wearable device 100. For example, one or more of the sensors 1602 may be built-in to the wearable device 100 during manufacture. In another example, one or more of the sensors 1602 or a portion thereof may be incorporated into a band. In other implementations, the sensors 1602 may be part of another device. For example, the sensors 1602 may comprise a device external to, but in communication with, the wearable device 100 using Bluetooth, Wi-Fi, 4G, LTE, 5G, ZigBee, Z-Wave, or another wireless or wired communication technology.

The one or more sensors 1602 may include one or more switches 1602(1) that are configured to accept input from the user. The switches 1602(1) may comprise mechanical, capacitive, optical, or other mechanisms. For example, the switches 1602(1) may comprise mechanical switches configured to accept an applied force as transferred by a button to generate an input signal.

A blood pressure sensor 1602(2) may be configured to provide sensor data that is indicative of the user's blood pressure. For example, the blood pressure sensor 1602(2) may comprise a camera that acquires images of blood vessels and determines the blood pressure by analyzing the changes in diameter of the blood vessels over time. In another example, the blood pressure sensor 1602(2) may comprise a sensor transducer that is in contact with the skin of the user that is proximate to a blood vessel.

A heart rate monitor 1602(3) may be configured to provide sensor data that is indicative of a cardiac pulse rate and data indicative of oxygen saturation of the user's blood. One or more sensors 1602, such as the heart rate monitor 1602(3) may include an emitter that emits light and a detector that detects light. For example, an optical heart rate monitor 1602(3) may use one or more light emitting diodes (LEDs) and corresponding photodetectors to determine changes in apparent color of the blood of the user resulting from oxygen binding with hemoglobin in the blood, providing information about oxygen saturation. Changes over time in apparent reflectance of light emitted by the LEDs may be used to determine cardiac pulse.

The sensors 1602 may include one or more touch sensors 1602(4). The touch sensors 1602(4) may use resistive, capacitive, surface capacitance, projected capacitance, mutual capacitance, optical, Interpolating Force-Sensitive Resistance (IFSR), or other mechanisms to determine the position of a touch or near-touch of the user. For example, the IFSR may comprise a material configured to change electrical resistance responsive to an applied force. The location within the material of that change in electrical resistance may indicate the position of the touch.

One or more microphones 1602(5) may be configured to acquire information about sound present in the environment. In some implementations, a plurality of microphones 1602(5) may be used to form a microphone array. The microphone array may implement beamforming techniques to provide for directionality of gain.

A temperature sensor (or thermometer) 1602(6) may provide information indicative of a temperature of an object. The temperature sensor 1602(6) in the wearable device 100 may be configured to measure ambient air temperature proximate to the user, the body temperature of the user, and so forth. The temperature sensor 1602(6) may comprise a silicon bandgap temperature sensor, thermistor, thermocouple, or other device. In some implementations, the temperature sensor 1602(6) may comprise an infrared detector configured to determine temperature using thermal radiation. For example, the temperature sensor 1602(6) may be mounted on the lower housing 102 within a mounting feature. In one implementation, the temperature sensor 1602(6) may be used to measure a temperature of the thermally conductive element 260. During use of the wearable device 100, a portion of the thermally conductive element 260 may be in contact with, or proximate to, the user wearing the wearable device 100. For example, the thermally conductive element 260 is coupled to the temperature sensor 1602(6) such that the temperature sensor 1602(6) measures the temperature of the thermally conductive element 260.

The sensors 1602 may include one or more light sensors 1602(7). The light sensors 1602(7) may be configured to provide information associated with ambient lighting conditions such as a level of illumination. The light sensors 1602(7) may be sensitive to wavelengths including, but not limited to, infrared, visible, or ultraviolet light. In contrast to a camera, the light sensor 1602(7) may typically provide a sequence of amplitude (magnitude) samples and color data while the camera provides a sequence of two-dimensional frames of samples (pixels).

One or more radio frequency identification (RFID) readers 1602(8), near field communication (NFC) systems, and so forth, may also be included as sensors 1602. The user, objects around the wearable device 100, locations within a building, and so forth, may be equipped with one or more radio frequency (RF) tags. The RF tags are configured to emit an RF signal. In one implementation, the RF tag may be a RFID tag configured to emit the RF signal upon activation by an external signal. For example, the external signal may comprise a RF signal or a magnetic field configured to energize or activate the RFID tag. In another implementation, the RF tag may comprise a transmitter and a power source configured to power the transmitter. For example, the RF tag may comprise a Bluetooth Low Energy (BLE) transmitter and battery. In other implementations, the tag may use other techniques to indicate its presence. For example, an acoustic tag may be configured to generate an ultrasonic signal, which is detected by corresponding acoustic receivers. In yet another implementation, the tag may be configured to emit an optical signal.

One or more RF receivers 1602(9) may also be included as sensors 1602. In some implementations, the RF receivers 1602(9) may be part of transceiver assemblies. The RF receivers 1602(9) may be configured to acquire RF signals associated with Wi-Fi, Bluetooth, ZigBee, Z-Wave, 3G, 4G, LTE, or other wireless data transmission technologies. The RF receivers 1602(9) may provide information associated with data transmitted via radio frequencies, signal strength of RF signals, and so forth. For example, information from the RF receivers 1602(9) may be used to facilitate determination of a location of the wearable device 100, and so forth.

The sensors 1602 may include one or more accelerometers 1602(10). The accelerometers 1602(10) may provide information such as the direction and magnitude of an imposed acceleration, tilt relative to local vertical, and so forth. Data such as rate of acceleration, determination of changes in direction, speed, tilt, and so forth, may be determined using the accelerometers 1602(10).

A gyroscope 1602(11) provides information indicative of rotation of an object affixed thereto. For example, the gyroscope 1602(11) may indicate whether the device has been rotated, rate of rotation, direction of rotation, and so forth.

A magnetometer 1602(12) may be used to determine an orientation by measuring ambient magnetic fields, such as the terrestrial magnetic field. For example, output from the magnetometer 1602(12) may be used to determine whether the device containing the sensor 1602, such as the wearable device 100, has changed orientation or otherwise moved. In other implementations, the magnetometer 1602(12) may be configured to detect magnetic fields generated by another device.

A glucose sensor 1602(13) may be used to determine a concentration of glucose within the blood or tissues of the user. For example, the glucose sensor 1602(13) may comprise a near infrared spectroscope that determines a concentration of glucose or glucose metabolites in tissues. In another example, the glucose sensor 1602(13) may comprise a chemical detector that measures presence of glucose or glucose metabolites at the surface of the user's skin.

A location sensor 1602(14) is configured to provide information indicative of a location. The location may be relative or absolute. For example, a relative location may indicate "kitchen", "bedroom", "conference room", and so forth. In comparison, an absolute location is expressed relative to a reference point or datum, such as a street address, geolocation comprising coordinates indicative of latitude and longitude, grid square, and so forth. The location sensor 1602(14) may include, but is not limited to, radio navigation-based systems such as terrestrial or satellite-based navigational systems. The satellite-based navigation system may include one or more of a Global Positioning System (GPS) receiver, a Global Navigation Satellite System (GLONASS) receiver, a Galileo receiver, a BeiDou Navigation Satellite System (BDS) receiver, an Indian Regional Navigational Satellite System, and so forth. In some implementations, the location sensor 1602(14) may be omitted or operate in conjunction with an external resource such as a cellular network operator providing location information, or Bluetooth beacons.

A fingerprint sensor 1602(15) is configured to acquire fingerprint data. The fingerprint sensor 1602(15) may use an optical, ultrasonic, capacitive, resistive, or other detector to obtain an image or other representation of features of a finger. For example, the fingerprint sensor 1602(15) may comprise a capacitive sensor configured to generate an image of the fingerprint of the user.

A proximity sensor 1602(16) may be configured to provide sensor data indicative of one or more of a presence or absence of an object, a distance to the object, or characteristics of the object. The proximity sensor 1602(16) may use optical, electrical, ultrasonic, electromagnetic, or other techniques to determine a presence of an object. For example, the proximity sensor 1602(16) may comprise a capacitive proximity sensor configured to provide an electrical field and determine a change in electrical capacitance due to presence or absence of an object within the electrical field.

An image sensor 1602(17) comprises an imaging element to acquire images in visible light, infrared, ultraviolet, and so forth. For example, the image sensor 1602(17) may comprise a complementary metal oxide (CMOS) imaging element or a charge coupled device (CCD).

An infrared (IR) thermometer 1602(18) may provide information indicative of a temperature of an object using infrared light. For example, an infrared detector may be mounted on the upper housing 104, beneath the external display cover 202, on the display 106, and so forth. The IR thermometer 1602(18) may be used to determine a temperature of the user's forehead, another person's forehead, and so forth. For example, the user may activate the IR thermometer 1602(18) to determine the temperature of another person to screen for a fever, without having to physically touch the other person.

The sensors 1602 may include other sensors 1602(S) as well. For example, the other sensors 1602(S) may include strain gauges, anti-tamper indicators, and so forth. For example, strain gauges or strain sensors may be embedded within the wearable device 100 and may be configured to provide information indicating that at least a portion of the wearable device 100 has been stretched or displaced such that the wearable device 100 may have been donned or doffed.

In some implementations, the sensors 1602 may include hardware processors, memory, and other elements configured to perform various functions. Furthermore, the sensors 1602 may be configured to communicate by way of a network or may couple directly with other devices.

The wearable device 100 may include or may couple to one or more output devices 1604. The output devices 1604 are configured to generate signals which may be perceived by the user, detectable by the sensors 1602, or a combination thereof.

Haptic output devices 1604(1) are configured to provide a signal, which results in a tactile sensation to the user. The haptic output devices 1604(1) may use one or more mechanisms such as electrical stimulation or mechanical displacement to provide the signal. For example, the haptic output devices 1604(1) may be configured to generate a modulated electrical signal, which produces an apparent tactile sensation in one or more fingers of the user. In another example, the haptic output devices 1604(1) may comprise piezoelectric or rotary motor devices configured to provide a vibration that may be felt by the user.

One or more audio output devices 1604(2) are configured to provide acoustic output. The acoustic output includes one or more of infrasonic sound, audible sound, or ultrasonic sound. The audio output devices 1604(2) may use one or more mechanisms to generate the acoustic output. These mechanisms may include, but are not limited to, the following: voice coils, piezoelectric elements, magnetostrictive elements, electrostatic elements, and so forth. For example, a piezoelectric buzzer or a speaker may be used to provide acoustic output by an audio output device 1604(2).

The display devices 1604(3) may be configured to provide output that may be seen by the user or detected by a light-sensitive detector such as the image sensor 1602(17) or light sensor 1602(7). The output may be monochrome or color. The display devices 1604(3) may be emissive, reflective, or both. An emissive display device 1604(3), such as using LEDs, is configured to emit light during operation. In comparison, a reflective display device 1604(3), such as using an electrophoretic element, relies on ambient light to present an image. Backlights or front lights may be used to illuminate non-emissive display devices 1604(3) to provide visibility of the output in conditions where the ambient light levels are low.

The display mechanisms of display devices 1604(3) may include, but are not limited to, micro-electromechanical systems (MEMS), spatial light modulators, electroluminescent displays, quantum dot displays, liquid crystal on silicon (LCOS) displays, cholesteric displays, interferometric displays, liquid crystal displays, electrophoretic displays, LED displays, and so forth. These display mechanisms are configured to emit light, modulate incident light emitted from another source, or both. The display devices 1604(3) may operate as panels, projectors, and so forth.

The display devices 1604(3) may be configured to present images. For example, the display devices 1604(3) may comprise a pixel-addressable display. The image may comprise at least a two-dimensional array of pixels or a vector representation of an at least two-dimensional image.

In some implementations, the display devices 1604(3) may be configured to provide non-image data, such as text or numeric characters, colors, and so forth. For example, a segmented electrophoretic display device 1604(3), segmented LED, and so forth, may be used to present information such as letters or numbers. The display devices 1604(3) may also be configurable to vary the color of the segment, such as using multicolor LED segments. For example, the display 106 may comprise a color LED display.

The wearable device 100 may include other output devices 1604(T).

Figure 17:
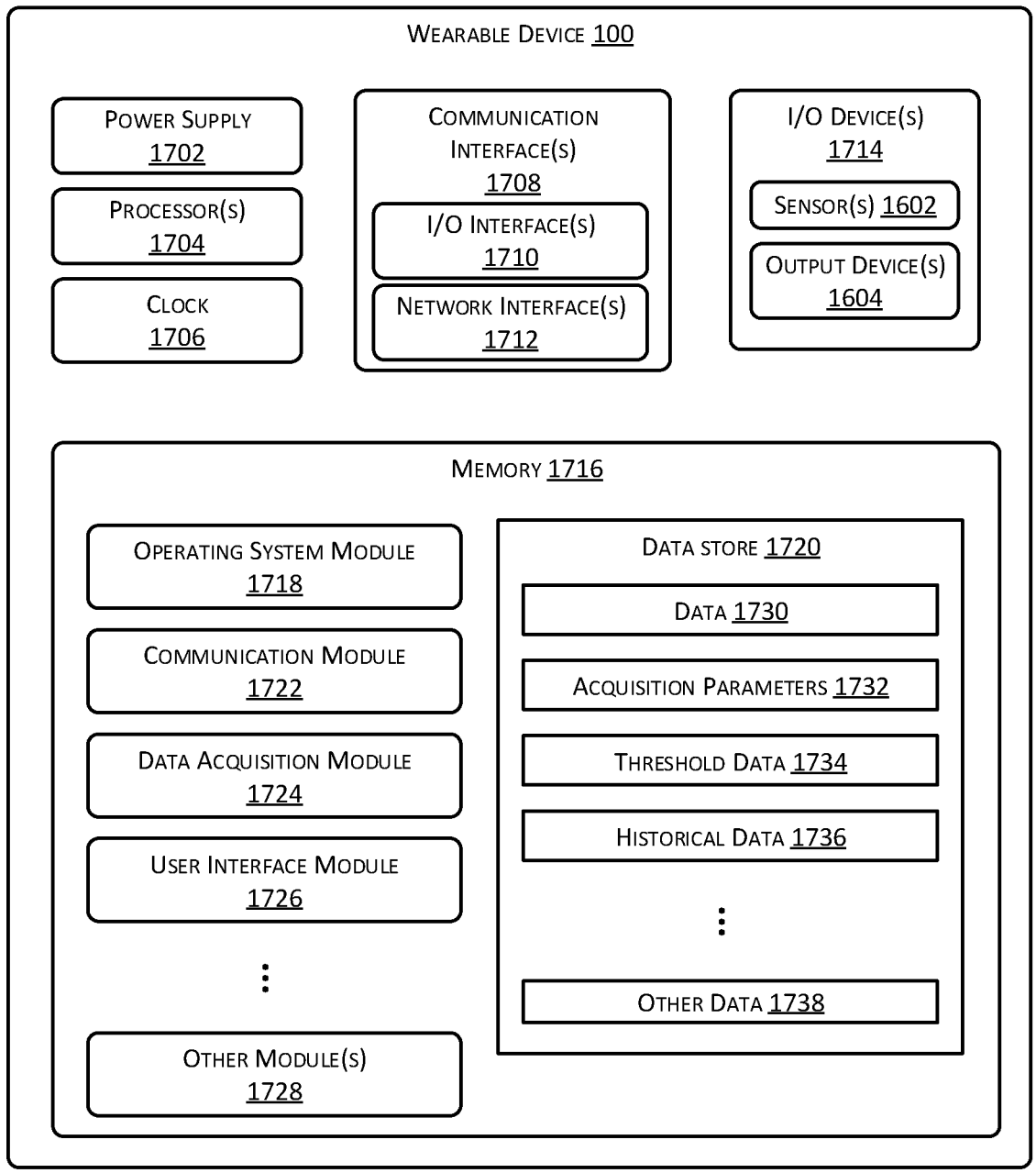
FIG. 17 illustrates a block diagram of some components of the wearable device, according to one implementation.

FIG. 17 illustrates a block diagram of some components of the wearable device, according to one implementation.

One or more power supplies 1702 are configured to provide electrical power suitable for operating the components in the wearable device 100. In some implementations, the power supply 1702 may comprise a rechargeable battery 218, fuel cell, photovoltaic cell, power conditioning circuitry, wireless power receiver, thermocouple, and so forth.

The wearable device 100 may include one or more hardware processors 1704 (processors) configured to execute one or more stored instructions. The processors 1704 may comprise one or more cores. One or more clocks 1706 may provide information indicative of date, time, ticks, and so forth. For example, the processor 1704 may use data from the clock 1706 to generate a timestamp, trigger a preprogrammed action, and so forth.

The wearable device 100 may include one or more communication interfaces 1708 such as input/output (I/O) interfaces 1710, network interfaces 1712, and so forth. The communication interfaces 1708 enable the wearable device 100, or components thereof, to communicate with other devices or components. The communication interfaces 1708 may include one or more I/O interfaces 1710. The I/O interfaces 1710 may comprise interfaces such as Inter-Integrated Circuit (I2C), Serial Peripheral Interface bus (SPI), Universal Serial Bus (USB) as promulgated by the USB Implementers Forum, RS-232, and so forth.

The I/O interface(s) 1710 may couple to one or more I/O devices 1714. The I/O devices 1714 may include input devices such as one or more of the sensors 1602. The I/O devices 1714 may also include output devices 1604 such as one or more of an audio output device 1604(2), a display device 1604(3), and so forth. In some embodiments, the I/O devices 1714 may be physically incorporated with the wearable device 100 or may be externally placed.

The network interfaces 1712 are configured to provide communications between the wearable device 100 and other devices, such as the sensors 1602, routers, access devices, and so forth. The network interfaces 1712 may include devices configured to couple to wired or wireless personal area networks (PANs), local area networks (LANs), wide area networks (WANs), and so forth. For example, the network interfaces 1712 may include devices compatible with Ethernet, Wi-Fi, Bluetooth, ZigBee, 4G, 5G, LTE, and so forth.

The wearable device 100 may also include one or more busses or other internal communications hardware or software that allow for the transfer of data between the various modules and components of the wearable device 100.

As shown in FIG. 17, the wearable device 100 includes one or more memories 1716. The memory 1716 comprises one or more computer-readable storage media (CRSM). The CRSM may be any one or more of an electronic storage medium, a magnetic storage medium, an optical storage medium, a quantum storage medium, a mechanical computer storage medium, and so forth. The memory 1716 provides storage of computer-readable instructions, data structures, program modules, and other data for the operation of the wearable device 100. A few example functional modules are shown stored in the memory 1716, although the same functionality may alternatively be implemented in hardware, firmware, or as a system on a chip (SOC).

The memory 1716 may include at least one operating system (OS) module 1718. The OS module 1718 is configured to manage hardware resource devices such as the I/O interfaces 1710, the network interfaces 1712, the I/O devices 1714, and provide various services to applications or modules executing on the processors 1704. The OS module 1718 may implement a variant of the FreeBSD operating system as promulgated by the FreeBSD Project; other UNIX or UNIX-like operating system; a variation of the Linux operating system as promulgated by Linus Torvalds; the Windows operating system from Microsoft Corporation of Redmond, Washington, USA; the Android operating system from Google Corporation of Mountain View, California, USA; the iOS operating system from Apple Corporation of Cupertino, California, USA; or other operating systems.

Also stored in the memory 1716 may be a data store 1720 and one or more of the following modules. These modules may be executed as foreground applications, background tasks, daemons, and so forth. The data store 1720 may use a flat file, database, linked list, tree, executable code, script, or other data structure to store information. In some implementations, the data store 1720 or a portion of the data store 1720 may be distributed across one or more other devices.

A communication module 1722 may be configured to establish communications with one or more of other devices, the sensors 1602, and so forth. The communications may be authenticated, encrypted, and so forth. The communication module 1722 may also control the communication interfaces 1708.

The memory 1716 may also store a data acquisition module 1724. The data acquisition module 1724 is configured to acquire sensor data. In some implementations the data acquisition module 1724 may be configured to operate the one or more sensors 1602, the microphone array 1602(S), and so forth. For example, the data acquisition module 1724 may determine that the sensor data satisfies a trigger event. The trigger event may comprise values of sensor data for one or more sensors 1602 exceeding a threshold value.

In another example, the data acquisition module 1724 on the wearable device 100 may receive instructions from another device, such as a smartphone, to acquire sensor data at a specified interval, at a scheduled time, and so forth.

A user interface module 1726 provides a user interface using one or more of the I/O devices 1714. The user interface module 1726 may be used to obtain input from the user, present information to the user, and so forth. For example, the user interface module 1726 may accept input from the user via the switch 1602(1) and use the display device 1604(3) such as an LED to provide output to the user.

One or more other modules 1728 may also be stored in the memory 1716.

Data 1730 may be stored in the data store 1720. For example, the data 1730 may comprise the sensor data, user preferences, and so forth.

One or more acquisition parameters 1732 may be stored in the memory 1716. The acquisition parameters 1732 may specify operation of the data acquisition module 1724, such as data sample rate, sample frequency, scheduling, and so forth.

Threshold data 1734 may be stored in the memory 1716. For example, the threshold data 1734 may specify one or more thresholds used by the data acquisition module 1724 to determine whether sensor data is to be retained or discarded.

The wearable device 100 may maintain historical data 1736. The historical data 1736 may be used to provide information about trends or changes over time. For example, the historical data 1736 may comprise data indicative of movement as measured by the accelerometer 1602(10) over several hours or days.

Other data 1738 may also be stored in the data store 1720.

The wearable device 100 may operate in conjunction with one or more other devices. For example, sensor data may be sent from the wearable device 100 to a smartphone, server, or other computing device for processing.

Specific physical embodiments as described in this disclosure are provided by way of illustration and not necessarily as a limitation. Those having ordinary skill in the art readily recognize that alternative implementations, variations, and so forth may also be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features, structures, and acts are disclosed as exemplary forms of implementing the claims.

Processes discussed herein may be implemented in hardware, software, or a combination thereof. In the context of software, the described operations represent computer-executable instructions stored on one or more non-transitory computer-readable storage media that, when executed by one or more processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described herein. The computer-readable storage medium may be one or more of an electronic storage medium, a magnetic storage medium, an optical storage medium, a quantum storage medium, and so forth. For example, the computer-readable storage media may include, but is not limited to, hard drives, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case, and a variety of alternative implementations will be understood by those having ordinary skill in the art.

Additionally, those having ordinary skill in the art will readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as illustrative forms of implementing the claims.

What is claimed is:

1. A system comprising:
   an emitter;
   a detector;
   an upper housing; and
   a lower housing affixed to the upper housing, wherein the lower housing comprises:
      a first portion that is optically opaque to a first wavelength of light; and
      a second portion that is transparent to the first wavelength of light;
      wherein the first portion of the lower housing comprises:
         an inner surface facing the upper housing;
         an outer surface opposite the inner surface;
         a first window opening having a first edge, a second edge, a third edge, and a fourth edge;
         a second window opening having a fifth edge, a sixth edge, a seventh edge, and an eighth edge, wherein the third edge is adjacent to the fifth edge; and
         an optical baffle that extends upward from the first portion of the lower housing, wherein the optical baffle is:
            adjacent to the first edge,
            adjacent to the fourth edge,
            between the third edge and the fifth edge,
            adjacent to the sixth edge, and
            adjacent to the seventh edge; and
      wherein the second portion of the lower housing is disposed within the first portion and comprises:
         a first side that contacts the inner surface of the first portion;
         a second side opposite the first side that faces away from the first portion;
         a first extension positioned at least partially within the first window opening;
         a second extension positioned at least partially within the second window opening; and
         a first opening proximate to the first extension and the second extension, wherein the optical baffle of the first portion extends through the first opening of the second portion, wherein the optical baffle extends beyond the first side and the second side of the second portion, and wherein a portion of the optical baffle that extends beyond the first side and the second side extends toward the upper housing;
      wherein the emitter and the detector are positioned between the second portion and the upper housing, and wherein the portion of the optical baffle that extends beyond the first side and the second side and toward the upper housing is positioned between the emitter and the detector.

2. The system of claim 1, the lower housing further comprising:
   a receptacle comprising:
      a second opening having a first width;
      a third opening having a second width, wherein the first width is greater than the second width, and wherein a passageway extends between the second opening and the third opening;
      a notch within an inner surface of the receptacle; and
      a first retention ridge in the receptacle between the second opening and the third opening; and
   the system further comprising a band, the band comprising:
      a flexible member having a first surface; and
      a protrusion extending from the first surface at a first location on the flexible member, wherein the protrusion comprises:
         an elastomeric material with an enlarged tip that has an uncompressed size that is: smaller than the second opening and larger than the first retention ridge; and
         a rigid member that is at least partially within the elastomeric material, wherein a first portion of the rigid member is outside of the elastomeric material and extends towards the notch.

3. The system of claim 1, further comprising:
   a first aperture in the first portion of the lower housing;
   a second aperture in the second portion of the lower housing, wherein the first aperture and the second aperture are adjacent;
   a thermally conductive member, wherein the thermally conductive member extends from proximate to an interior surface of the second portion, through the first aperture and the second aperture, to proximate to the outer surface of the lower housing; and
   a temperature sensor to determine temperature of the thermally conductive member.

4. The system of claim 1, further comprising:
a circuit board comprising a first electrical contact on an upper surface of the circuit board;
a first structure comprising:
a first antenna; and
a first spring contact, wherein:
the first spring contact provides an electrically conductive pathway to at least a portion of the first antenna, and
a portion of the first spring contact extends from a lower surface of the first structure; and
at least one mechanical fastener to join the first structure to the second portion of the lower housing, wherein at least a portion of the circuit board is between the first structure and the second portion.

5. The system of claim 1, the lower housing further comprising:
a first recess in a third side of the lower housing;
a second recess in a fourth side of the lower housing, wherein the fourth side is opposite the third side; and
the system further comprising:
a first structure comprising:
a first engagement feature to mechanically engage the first recess; and
a second engagement feature to mechanically engage the second recess.

6. The system of claim 5, the lower housing further comprising:
a first aperture in the first portion, wherein the first aperture is between the first recess and the second recess;
a second aperture in the first portion, wherein the second aperture is between the first recess and the second recess;
a first electrical contact that extends at least partially into the first aperture; and
a second electrical contact that extends at least partially into the second aperture; and
the system further comprising:
a second structure comprising:
a first surface;
a first pogo pin extending through the first surface, wherein the first pogo pin is configured to establish electrical contact with the first electrical contact; and
a second pogo pin extending through the first surface, wherein the second pogo pin is configured to establish electrical contact with the second electrical contact; and
circuitry to provide electrical power to the first pogo pin and the second pogo pin,
wherein the first pogo pin and the second pogo pin are located between the first engagement feature and the second engagement feature.

7. The system of claim 1, wherein:
the emitter emits light at the first wavelength and is arranged proximate to the first extension of the second portion of the lower housing that is disposed within the first window opening; and
the detector detects light at the first wavelength, wherein the detector is arranged proximate to the second extension.

8. A system comprising:
a first structure; and
a second structure;
wherein the first structure comprises:
a single piece of a first material that is optically opaque to a first wavelength of light;
an inner surface;
an outer surface opposite the inner surface;
a first aperture in the first material;
a second aperture in the first material, wherein the second aperture is proximate to the first aperture; and
a baffle between the first aperture and the second aperture, wherein the baffle extends from the first structure toward the second structure; and wherein the second structure is disposed within the first structure and comprises:
a single piece of a second material that is transmissive of the first wavelength of light and that comprises a first side that contacts the inner surface of the first structure and a second side opposite the first side that faces away from the first structure;
a first portion of the second structure that is disposed within the first aperture; and
a second portion of the second structure that is disposed within the second aperture; wherein:
the second structure includes a first opening between the first portion and the second portion,
the baffle of the first structure extends through the first opening of the second structure, and
the baffle of the first structure extends beyond the first side and the second side of the second structure and a portion of the baffle that extends beyond the first side and the second side is positioned between the first portion and the second portion.

9. The system of claim 8, wherein:
the first aperture has a first edge, a second edge, a third edge, and a fourth edge;
the second aperture has a fifth edge, a sixth edge, a seventh edge, and an eighth edge, wherein the third edge is adjacent to the fifth edge; and
wherein the baffle is:
adjacent to the first edge,
adjacent to the fourth edge,
between the third edge and the fifth edge,
adjacent to the sixth edge, and
adjacent to the seventh edge.

10. The system of claim 8, further comprising:
a first emitter that emits light at the first wavelength, wherein the first emitter is arranged proximate to the first portion of the second structure that is disposed within the first aperture, wherein the second structure is positioned between the first emitter and the first structure, and further wherein emitted light passes through the first portion;
a detector that detects light at the first wavelength, wherein the detector is arranged proximate to the second portion of the second structure that is disposed within the second aperture, wherein the second structure is positioned between the detector and the first structure, and further wherein detected light passes through the second portion; and
wherein the portion of the baffle that extends beyond the first side and the second side is positioned between the first emitter and the detector.

11. The system of claim 8, the first structure further comprising:
a receptacle comprising:
a second opening having a first width;
a third opening having a second width, wherein:
the first width is greater than the second width, and
a passageway extends between the second opening and the third opening;
a notch in an inner surface of the receptacle; and
a first retention ridge in the receptacle between the second opening and the third opening.

12. The system of claim 11, further comprising a band, the band comprising:
- a flexible member;
- a protrusion extending from the flexible member, wherein the protrusion comprises:
  - an elastomeric material with an enlarged tip that has an uncompressed size that is: smaller than the second opening and larger than the first retention ridge; and
  - a rigid member that is at least partially within the elastomeric material, wherein a first portion of the rigid member is outside of the elastomeric material and extends towards the notch.

13. The system of claim 8, further comprising:
- a third aperture in the first structure;
- a fourth aperture in the second structure, wherein the third aperture is adjacent to the fourth aperture;
- a thermally conductive member, wherein the thermally conductive member extends from proximate to an interior surface of the second structure, through the third aperture and the fourth aperture, to proximate to the outer surface of the first structure; and
- a temperature sensor that is proximate to the interior surface of the second structure, wherein the temperature sensor is coupled to the thermally conductive member.

14. The system of claim 8, further comprising:
- a third structure;
- a fourth structure;
- a spring contact having at least a portion that is between the third structure and the fourth structure, wherein the spring contact provides an electrically conductive pathway between the third structure and the fourth structure; and
- at least one mechanical fastener to join the fourth structure to the second structure, wherein at least a portion of the third structure is between the fourth structure and the second structure.

15. The system of claim 8, wherein the second material is transparent to the first wavelength of light.

16. The system of claim 8, the first structure further comprising:
- a third side;
- a fourth side that is opposite the third side;
- a first recess in the third side of the first structure; and
- a second recess in the fourth side of the first structure, wherein the first recess is opposite the second recess.

17. The system of claim 16, the first structure further comprising:
- a third aperture in the first material, wherein the third aperture is between the first recess and the second recess;
- a fourth aperture in the first material, wherein the fourth aperture is between the first recess and the second recess;
- a first electrical contact that extends at least partially into the third aperture; and
- a second electrical contact that extends at least partially into the fourth aperture; and the system further comprising:
- a third structure comprising:
  - a first surface;
  - a first pogo pin extending through the first surface, wherein the first pogo pin is configured to establish electrical contact with the first electrical contact;
  - a second pogo pin extending through the first surface, wherein the second pogo pin is configured to establish electrical contact with the second electrical contact; and
  - circuitry to provide electrical power to the first pogo pin and the second pogo pin; and
- a fourth structure comprising a single piece of material, the fourth structure further comprising:
  - a first engagement feature to mechanically engage the first recess; and
  - a second engagement feature to mechanically engage the second recess; and wherein the first pogo pin and the second pogo pin are located between the first engagement feature and the second engagement feature.

18. A method comprising:
- forming a first material into a first structure, wherein the first material comprises a transparent material, and wherein the first structure comprises an outer surface and an inner surface opposite the outer surface; and
- forming a second material into a second structure over at least a portion of the outer surface of the first structure, such that the first structure is disposed within the second structure, wherein:
  - the second material comprises an inner portion and an outer portion opposite the inner portion,
  - the outer surface of the first material contacts the inner portion of the second material,
  - the inner surface that is opposite the outer surface faces away from the second material, a first portion of the first material remains exposed to serve as a first window for a first aperture in the second material,
  - a second portion of the first material remains exposed to serve as a second window for a second aperture in the second material, and
  - a third portion of the second material extends through an opening in the first material proximate to the first portion and the second portion, wherein:
    - the third portion of the second material extends beyond the outer surface and the inner surface of the first structure, and the third portion of the second material that extends beyond the outer surface and the inner surface of the first structure is positioned between the first portion of the first material and the second portion of the first material.

19. The method of claim 18, wherein the first material comprises a first resin that is transparent to a first wavelength and the second material comprises a second resin that is opaque to the first wavelength; and
  the method further comprising:
  - mounting an emitter, that emits light at the first wavelength, proximate to the first portion of the first material, wherein emitted light passes through the first portion; and
  - mounting a detector, that detects light at the first wavelength, proximate to the second portion of the first material, wherein detected light passes through the second portion;
  - wherein the third portion of the second material that extends beyond the outer surface and the inner surface of the first structure is positioned between the emitter and the detector and blocks at least a portion of the light from the emitter from reaching the detector.

20. The method of claim 18, further comprising:
 inserting a thermally conductive member that extends from proximate to an interior surface of the first structure to proximate to the outer surface of the second material.

\* \* \* \* \*